US009940914B2

(12) United States Patent
Uemura et al.

(10) Patent No.: US 9,940,914 B2
(45) Date of Patent: Apr. 10, 2018

(54) SCORE DISPLAYING METHOD AND STORAGE MEDIUM

(71) Applicant: YAMAHA CORPORATION, Hamamatsu-shi, Shizuoka-ken (JP)

(72) Inventors: Norihiro Uemura, Hamamatsu (JP); Motoichi Tamura, Hamamatsu (JP); Yasuyuki Umeyama, Hamamatsu (JP); Takuya Fujishima, Hamamatsu (JP); Yoshihiro Katsumata, Hamamatsu (JP); Kazuki Kashiwase, Hamamatsu (JP); Motoji Nagata, Hamamatsu (JP); Akira Maezawa, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 14/669,229

(22) Filed: Mar. 26, 2015

(65) Prior Publication Data

US 2015/0279342 A1 Oct. 1, 2015

(30) Foreign Application Priority Data

Mar. 26, 2014 (JP) ................................ 2014-064262
Oct. 16, 2014 (JP) ................................ 2014-211747
Feb. 27, 2015 (JP) ................................ 2015-038920

(51) Int. Cl.
*G09B 15/02* (2006.01)
*G10H 1/00* (2006.01)
*G10G 1/00* (2006.01)

(52) U.S. Cl.
CPC ............ *G10H 1/0025* (2013.01); *G10G 1/00* (2013.01); *G10H 1/0008* (2013.01);
(Continued)

(58) Field of Classification Search
CPC ... G10H 1/0025; G10H 2220/005; G10G 1/00
(Continued)

(56) References Cited

U.S. PATENT DOCUMENTS 5,706,363 A 1/1998 Kikuchi
7,365,261 B2 * 4/2008 Hirano ................ G10H 1/0008
84/470 R (Continued)

FOREIGN PATENT DOCUMENTS

JP 0535924 A 2/1993
JP 06102869 A 4/1994

(Continued)

OTHER PUBLICATIONS

European Search Report issued in counterpart application No. EP15160497.2, dated Dec. 15, 2015.

(Continued)

*Primary Examiner* — Jianchun Qin
(74) *Attorney, Agent, or Firm* — Rossi, Kimms & McDowell LLP

(57) ABSTRACT

A controller of a score displaying apparatus operates in a view mode displaying a score on a screen of a user I/F 12, and a writing mode obtaining information indicating writing on the score via the user I/F 12. In response to one operation specifying one grand staff by a user in the view mode, the controller performs a process of enlarging an image of an image area to which the specified grand staff belongs and displaying the enlarged image on a foreground of a center of the screen, and performs a process of switching a control mode from the view mode to the writing mode.

13 Claims, 16 Drawing Sheets

(52) U.S. Cl.
CPC . *G10H 2220/015* (2013.01); *G10H 2220/096* (2013.01); *G10H 2220/121* (2013.01)

(58) Field of Classification Search
USPC .......................................................... 84/483.2
See application file for complete search history.

(56) References Cited

U.S. PATENT DOCUMENTS

| | | | |
|---|---|---|---|
| 7,453,035 B1 | 11/2008 | Evans et al. | |
| 7,842,871 B2 | 11/2010 | Ishii et al. | |
| 2001/0023633 A1 | 9/2001 | Matsumoto | |
| 2002/0066357 A1 | 6/2002 | Kosakaya et al. | |
| 2005/0241462 A1 | 11/2005 | Hirano | |
| 2007/0260981 A1 | 11/2007 | Kim et al. | |
| 2011/0132172 A1* | 6/2011 | Gueneux | G10G 1/00 84/454 |

FOREIGN PATENT DOCUMENTS

| | | | |
|---|---|---|---|
| JP | 06102870 | A | 4/1994 |
| JP | 06102871 | A | 4/1994 |
| JP | H06318235 | A | 11/1994 |
| JP | H0798769 | A | 4/1995 |
| JP | H1173411 | A | 3/1999 |
| JP | 2001265327 | A | 9/2001 |
| JP | 2003177745 | A | 6/2003 |
| JP | 2005316207 | A | 11/2005 |
| JP | 2007299394 | A | 11/2007 |
| JP | 2009151712 | A | 7/2009 |
| JP | 2009230006 | A | 10/2009 |
| JP | 2012185340 | A | 9/2012 |
| WO | 201209279 | A1 | 7/2012 |

OTHER PUBLICATIONS

Office Action issued in Japanese Appln. No. 2015-038920, dated Aug. 16, 2016. English machine translation provided.
Office Action issued in Japanese Application No. 2016-202422 dated Nov. 7, 2017. English translation provided.

* cited by examiner

{Fig. 1}
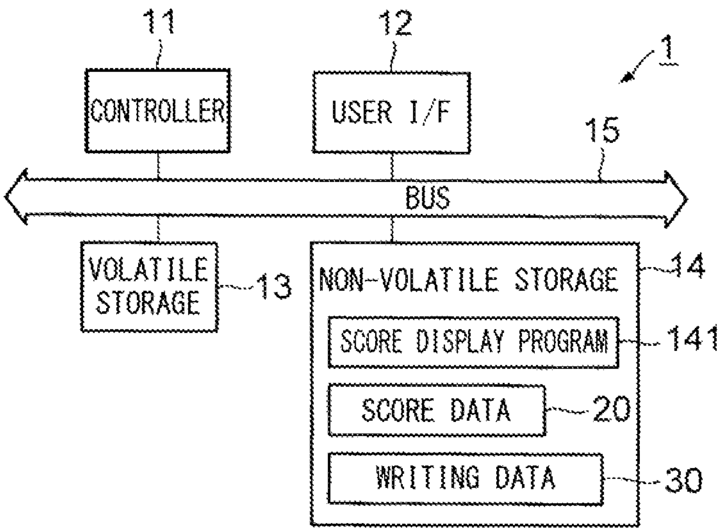
{Fig. 2}
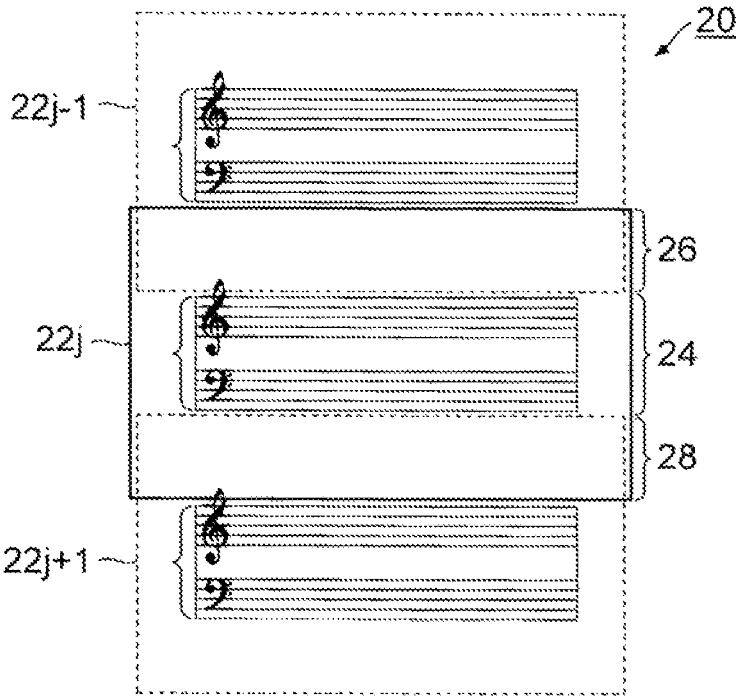

{Fig. 3}
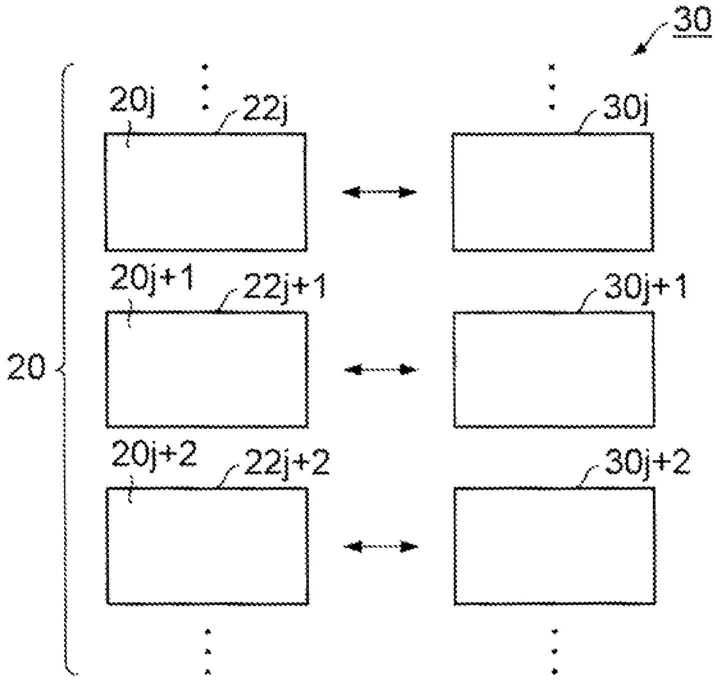
{Fig. 4}
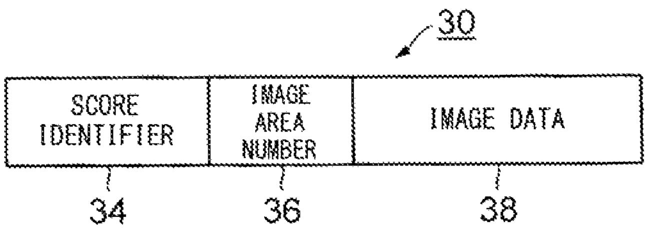

{Fig. 5}
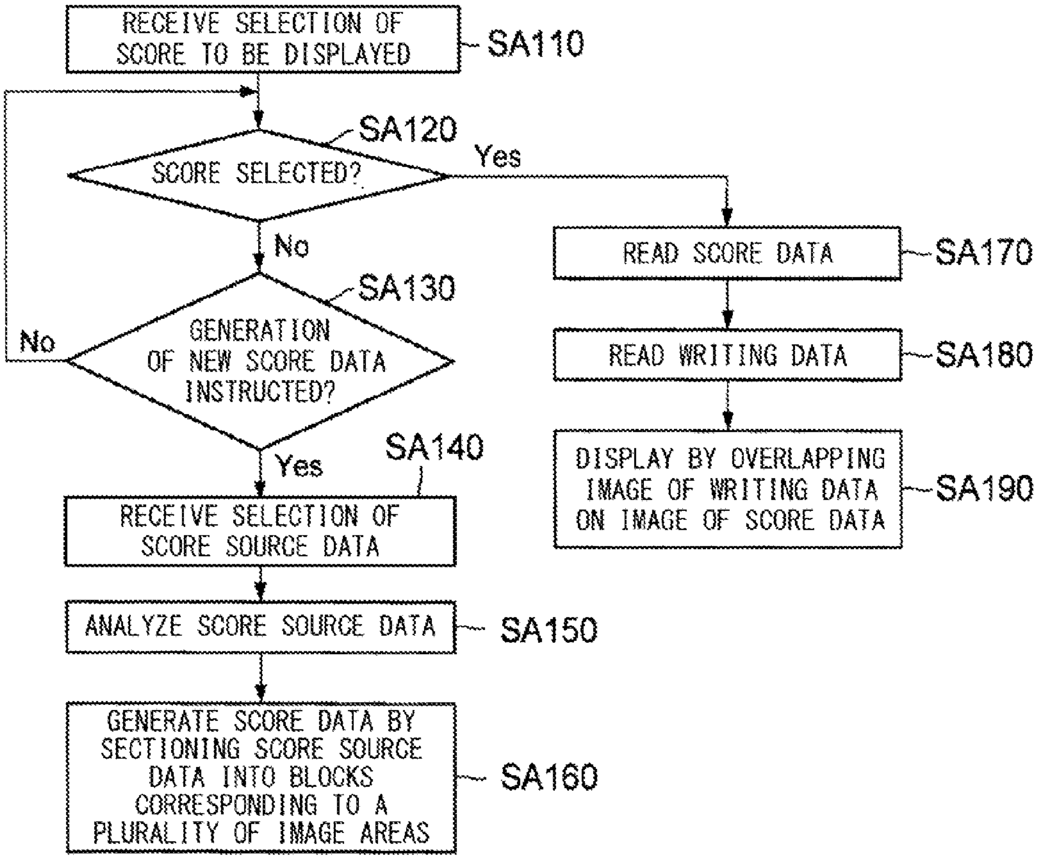

{Fig. 6}
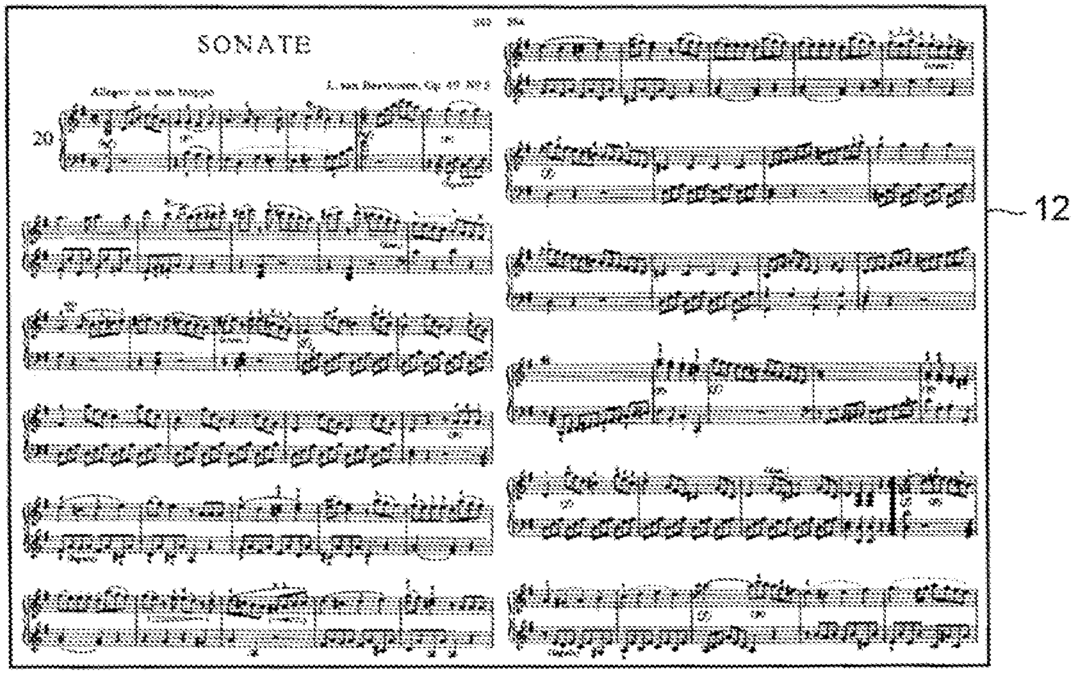

{Fig. 7}
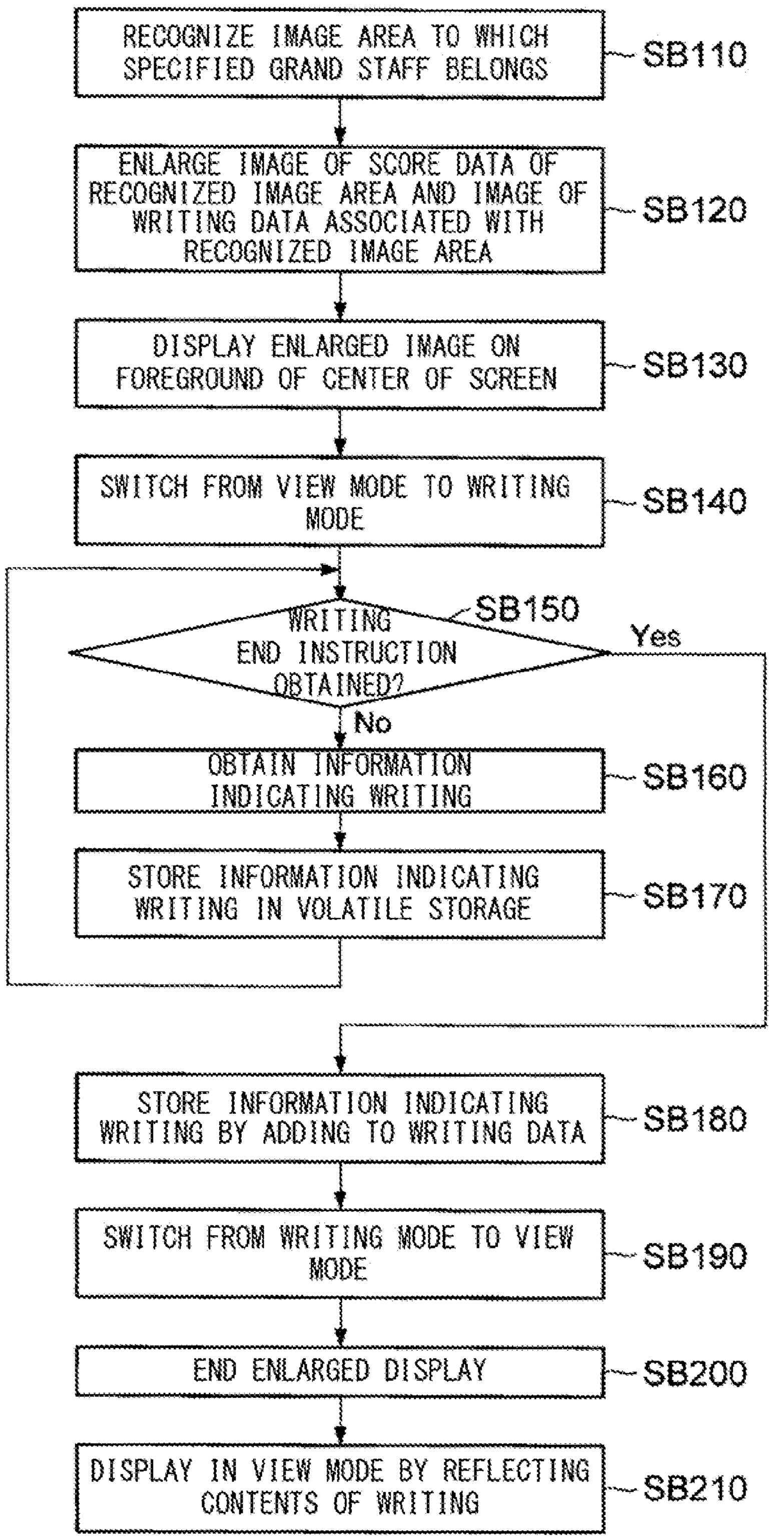

{Fig. 8}
{Fig. 9}
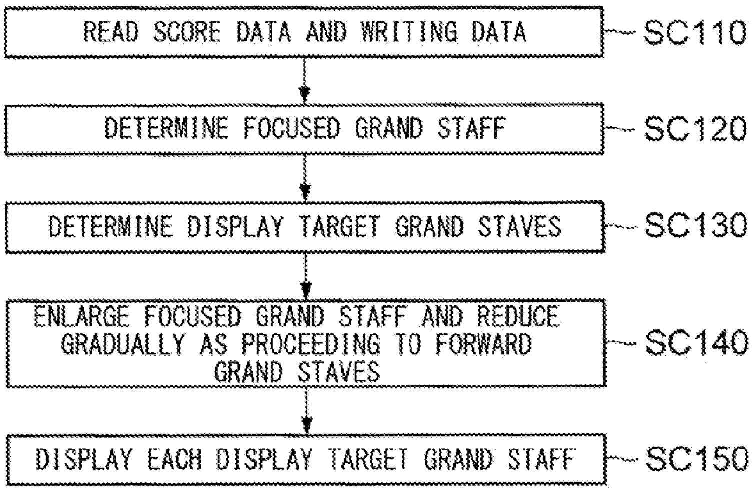

{Fig. 10}
{Fig. 11}
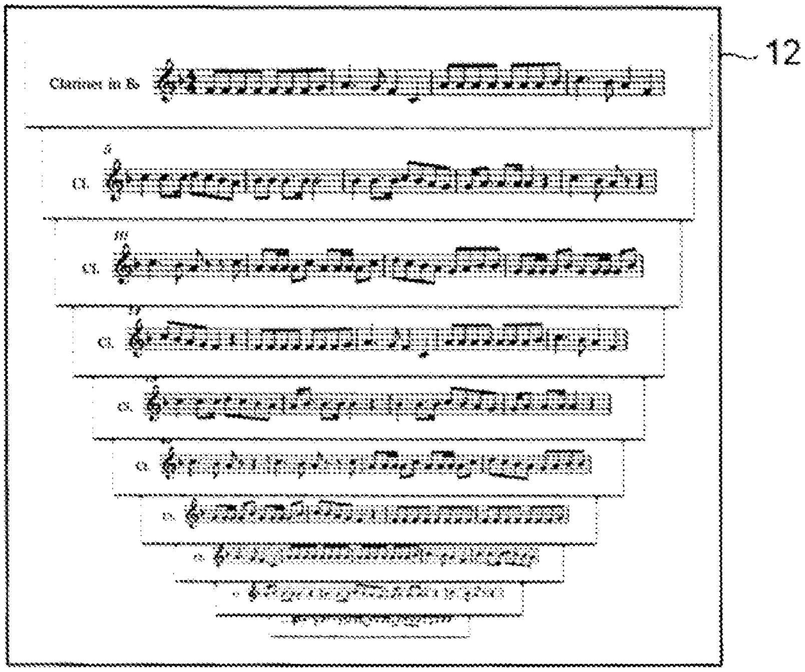

{Fig. 12}
PRIOR ART
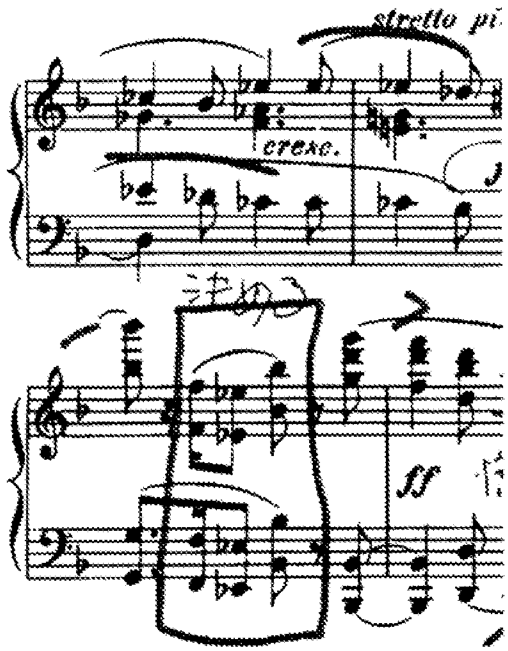
{Fig. 13}
PRIOR ART
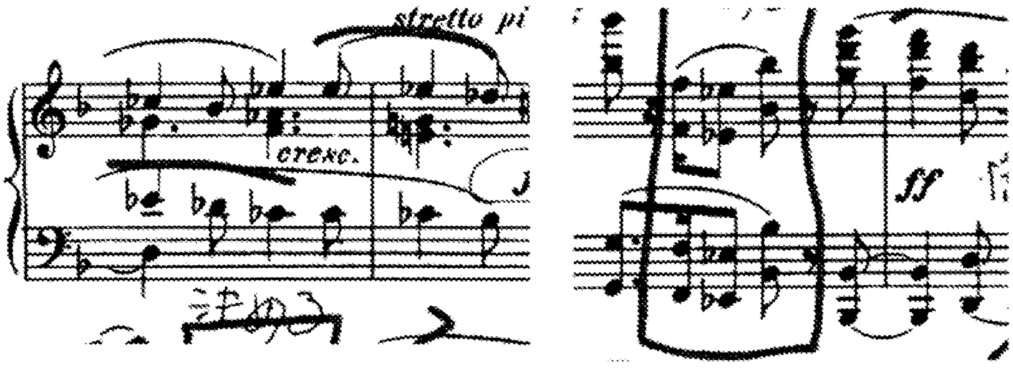

{Fig. 14}
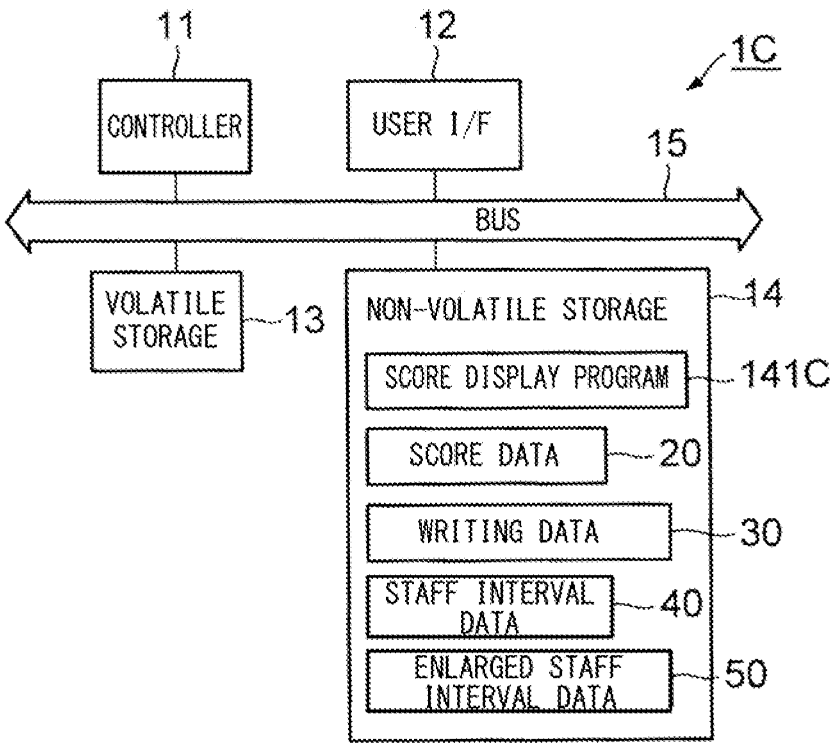

{Fig. 15}
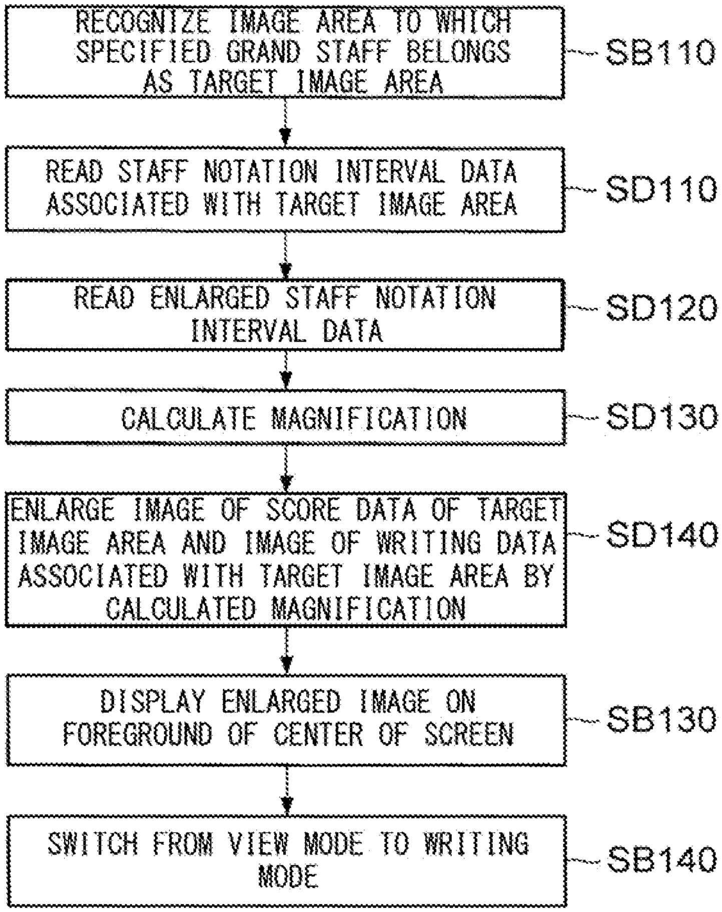

{Fig. 16A}
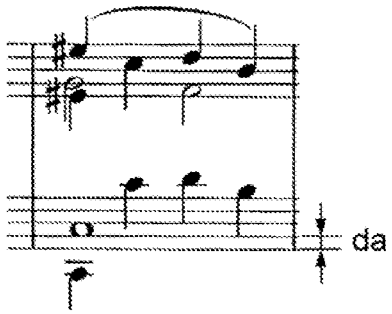
{Fig. 16B}
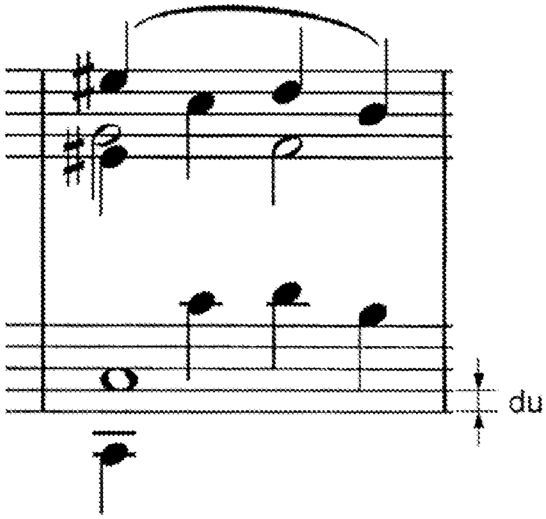
{Fig. 17A}
{Fig. 17B}
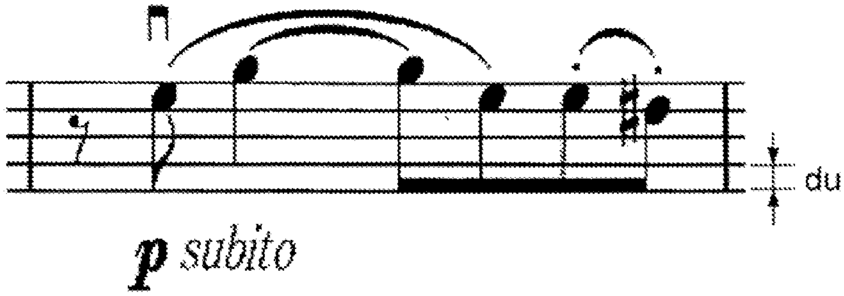

{Fig. 18}
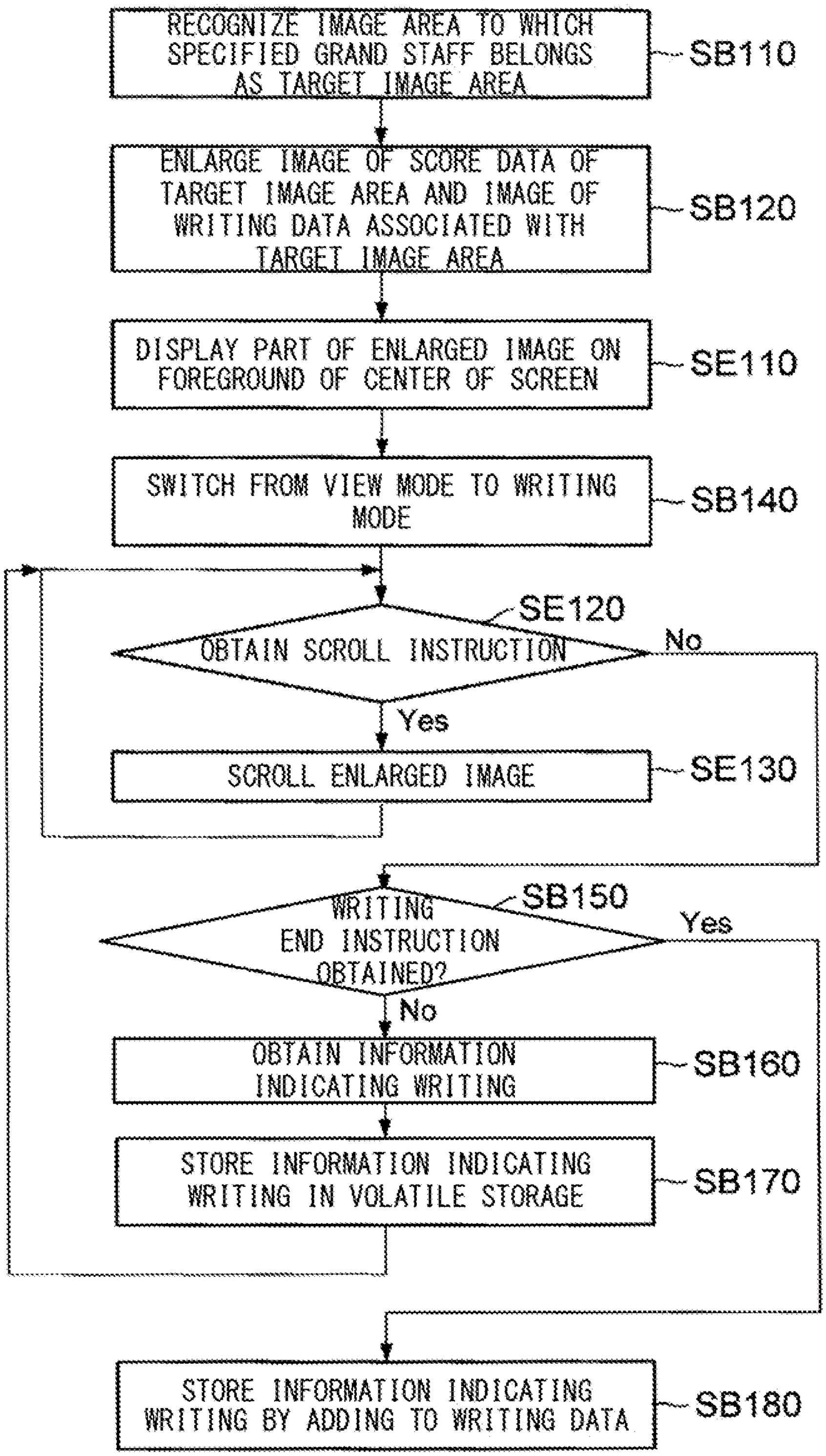

{Fig. 19}
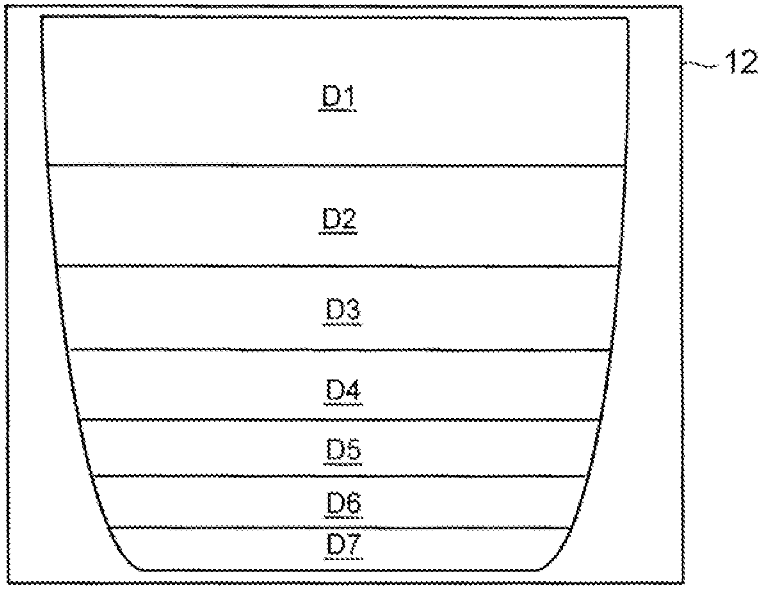
{Fig. 20}
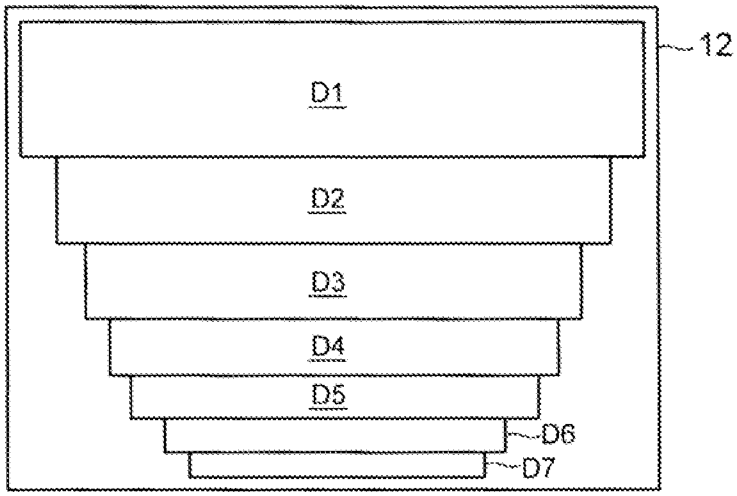

{Fig. 21}
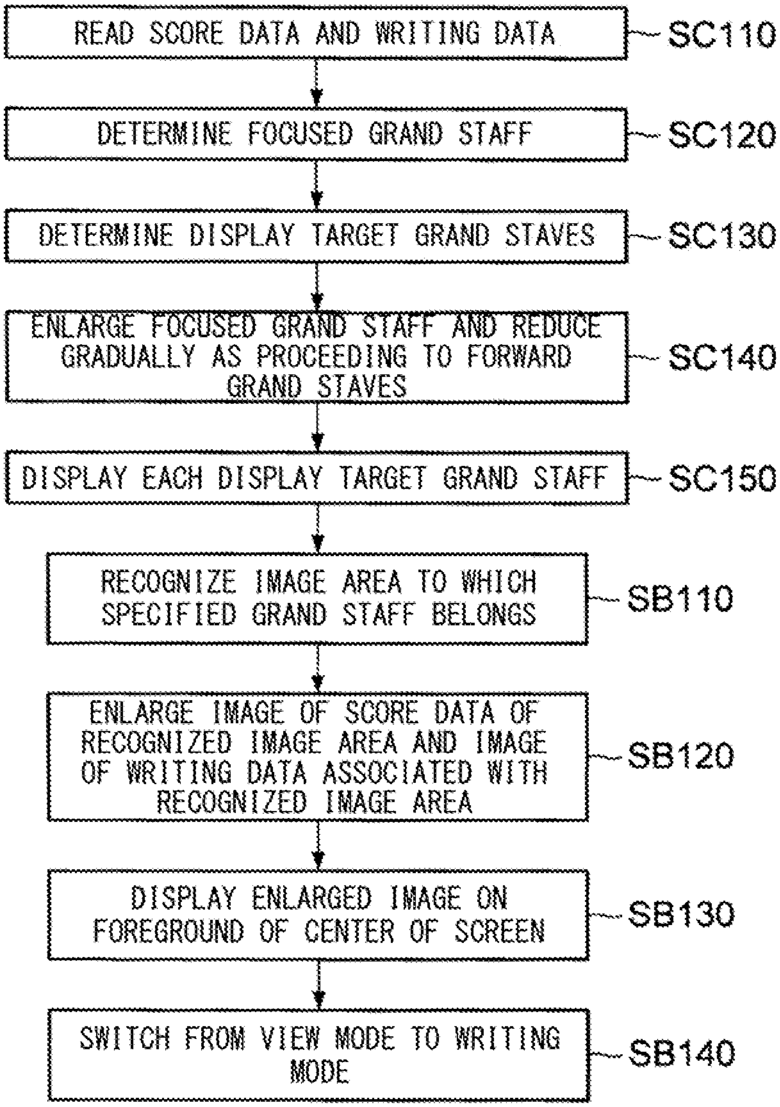

{Fig. 22}
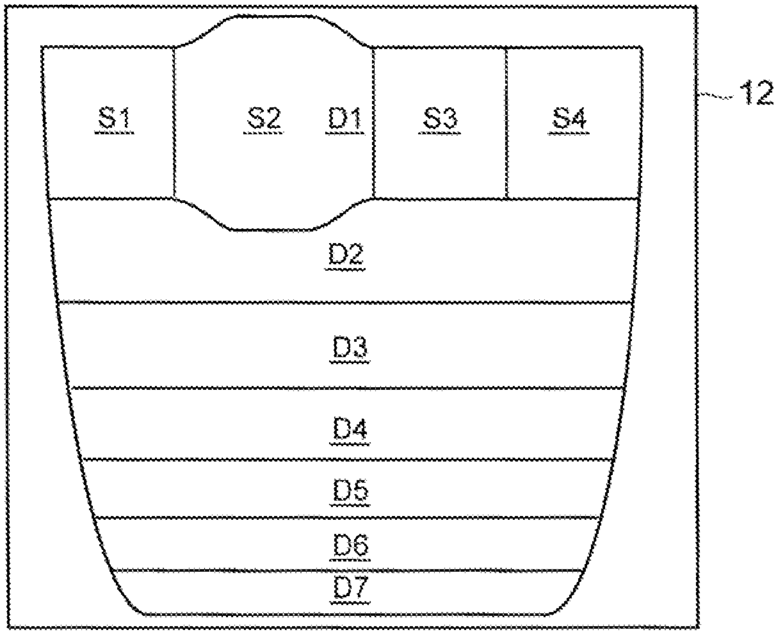
{Fig. 23}
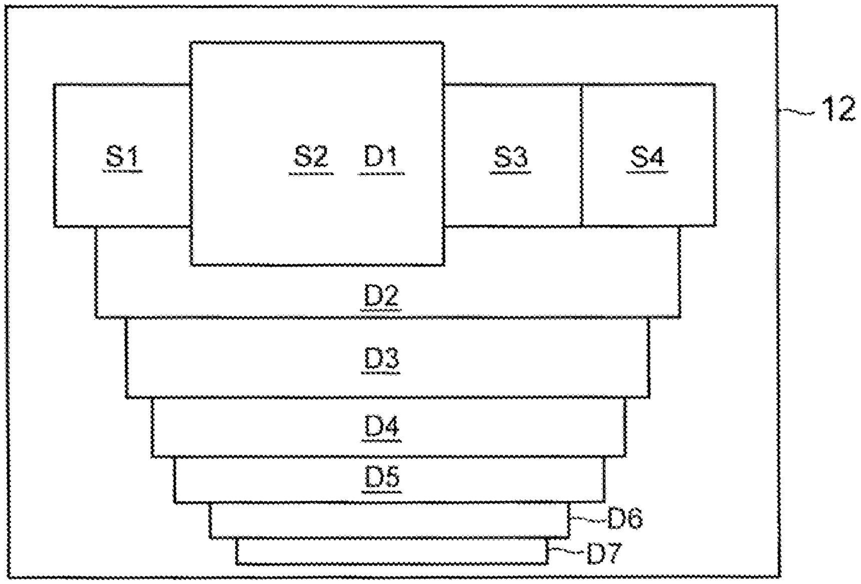

{Fig. 24}
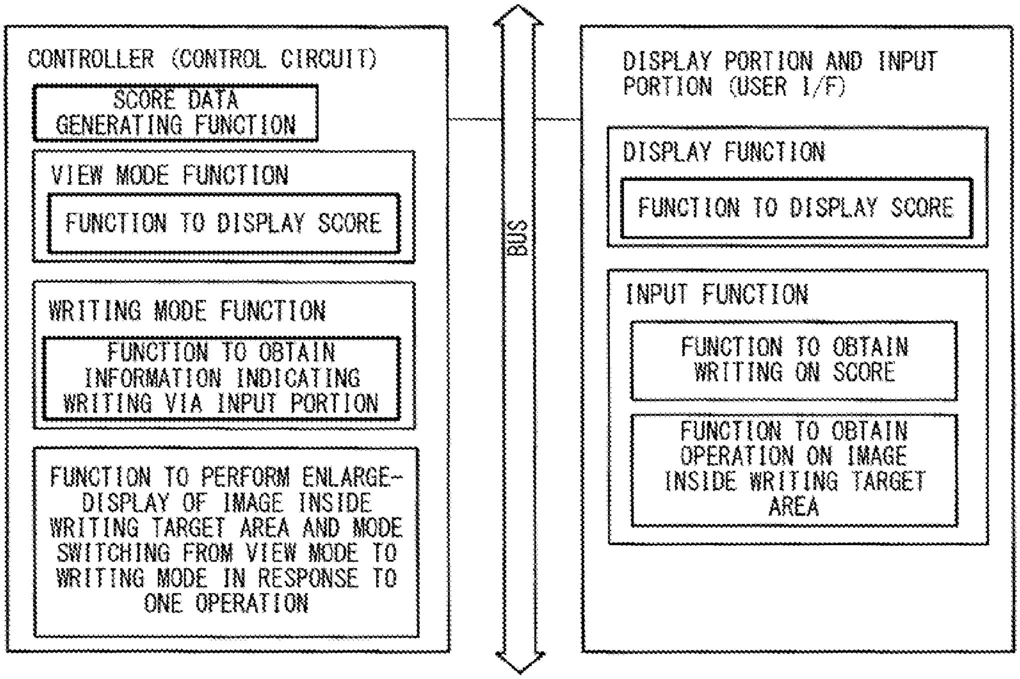

SCORE DISPLAYING METHOD AND STORAGE MEDIUM

TECHNICAL FIELD

The invention relates to a score displaying method for displaying an electronic score and a non-transitory machine-readable storage medium containing program instructions for enabling a computer to perform such a score displaying method.

BACKGROUND ART

There is a score displaying apparatus which displays an electronic score (hereinafter simply referred to as a score) on a screen of a display device (see, for example, PTL1). In some cases, a user of the score displaying apparatus performs music while looking at the score displayed on the screen. Further, in some cases, the user of the score displaying apparatus writes a comment or the like on the score displayed on the screen.

CITATION LIST

Patent Literature

{PTL1}JP 2001-265327 A

SUMMARY OF INVENTION

Technical Problem

Such a score displaying apparatus has problems in writing on the score or display of the score, and is not always convenient. An example of a score displaying apparatus of a tablet terminal type having a touch panel will be described below. First, a problem related to writing on the score will be described. A user of a score displaying apparatus of this kind normally writes a comment or the like on the score as follows. First, the user causes a portion on which writing is desired to be displayed in the vicinity of a center of a screen by performing a swipe operation on the screen. Next, the user enlarges the entire score image to a size appropriate for writing by performing a pinch-out operation on the screen. Next, the user shifts a control mode of the score displaying apparatus to a writing mode by specifying a writing tool. The writing mode refers to a control mode causing the score displaying apparatus to obtain information indicating writing. Next, the user performs writing on the score by sweeping the screen or the like. Next, the user shifts the control mode of the score displaying apparatus to a view mode by instructing to end the writing tool. The view mode refers to a normal control mode to display a score. Finally, the user reduces the entire score image by performing a pinch-in operation on the screen. Thus, to perform writing on the score, there is a problem that the user needs to perform a lot of operations.

Further, there is another problem in writing on the score. FIG. 12 is a view illustrating a display example of a score on which writing is performed. In the example illustrated in FIG. 12, two upper and lower grand staves are displayed. In the lower grand staff, a square enclosure is written, and on an upper side of this enclosure, a comment "strike" is written in Japanese letters. However, the writing "strike" is displayed in a position closer to the upper grand staff than the lower grand staff. FIG. 13 illustrates the lower grand staff of FIG. 12 on a right side of the upper grand staff of FIG. 12. That is, in FIG. 13, the grand staves of FIG. 12 are re-displayed together in one grand staff (reflowed). As illustrated in FIG. 13, the comment "strike" is not displayed on an upper side of the portion which was the lower grand staff in FIG. 12, but is displayed on a lower side of the portion which was the upper grand staff in FIG. 12. Thus, regarding writing on the score, there is a problem that the written content on the score moves to an irrelevant position by reflow or the like.

Next, a problem related to display of a score will be described. When notes (including a rest in this specification) and the like are small and difficult to see in a current performance position in the score, the user enlarges the entire score image by performing a pinch-out operation on the screen. When the entire score image is thus enlarged, displayed are not many bars and grand staves which are located forward of the bar and the grand staff to which the current performance position belongs. Accordingly, the notes and the like in the current performance position are easy to see, but meanwhile it is difficult to grasp in advance a phrase and the like located forward of the current performance position. On the contrary, when the entire score image is reduced, displayed are many grand staves located forward of the bar and the grand staff in the current performance position, and thus a phrase and the like located forward of the current performance position can be easily grasped in advance. However, the notes and the like in the current performance position become difficult to see.

The present invention is made in view of the above-described situation, and it is an object thereof to provide technical means which improve convenience of an apparatus displaying an electronic score.

Solution to Problem

The invention provides a score displaying method performed by an apparatus, the apparatus including a display and an input portion, the method including: displaying, in a view mode, a score on the display; receiving, in a writing mode of the apparatus, information indicating writing on the score via an input portion; and executing a process in response to one operation to the input portion, the process including displaying the score on the display such that a first area of the score on which the writing is to be accepted in the writing mode is relatively enlarged in comparison with outside of the first area and switching the apparatus from the view mode to the writing mode.

According to the score displaying method, by one operation by a user, an image inside the area of the score on which the writing is to be accepted is enlarged and displayed, and in addition, the apparatus is switched from the view mode to the writing mode. Thus, the user can perform writing on the score by less operation. Further, the user performs a writing operation in an enlarge-displayed area. Accordingly, the area on which the writing is accepted and a written content are associated with each other. Thus, movement of the written content on the score to an irrelevant position by reflow or the like will not happen. Therefore, highly convenient score display can be performed.

The invention further provides a score displaying method performed by an apparatus, the apparatus including a display and an input portion, the method including: displaying a score on the display such that a focused area of the score is relatively enlarged in comparison with an area in vicinity of the focused area; and displaying the area in the vicinity of the focused area such that the area in the vicinity of the focused area is gradually reduced with distance from the focused area.

By this score displaying method, an image inside a focused area in the score can be displayed, and images of areas around the focused area are gradually reduced with distance from the focused area and displayed. That is, the image of the focused area is relatively enlarged in comparison with images around the focused area. Further, since the images of surrounding areas are reduction-displayed, images in a wide range can be displayed. Accordingly, the user can visually clearly recognize the image inside the focused area, and can grasp images in surrounding areas in advance over a wide range. Therefore, highly convenient score display can be performed.

BRIEF DESCRIPTION OF DRAWINGS

FIG. 1 is a block diagram illustrating a configuration of a score displaying apparatus 1 according to a first embodiment of the present invention.

FIG. 2 is a conceptual diagram illustrating a structure of the score data 20 of the score displaying apparatus 1.

FIG. 3 is a conceptual diagram illustrating relation between the score data 20 and writing data 30 of the score displaying apparatus 1.

FIG. 4 is a conceptual diagram illustrating a data structure of the writing data 30 of the score displaying apparatus 1.

FIG. 5 is a flowchart illustrating a process performed by a controller 11 of the score displaying apparatus 1 when the controller 11 starts execution of a score display program 141 in response to an instruction from a user.

FIG. 6 is a view illustrating a display example of a score in a view mode of the score displaying apparatus 1.

FIG. 7 is a flowchart illustrating a process performed by the controller 11 of the score displaying apparatus 1 which received an instruction to start writing on the score from the user I/F 12.

FIG. 8 is a view illustrating a display example of a score in the writing mode of the score displaying apparatus 1.

FIG. 9 is a flowchart illustrating a process performed by a controller 11 of the score displaying apparatus 1A according to a second embodiment of the present invention after a score to be displayed on a screen is selected.

FIG. 10 is a view illustrating a display example of a score in the view mode of the score displaying apparatus 1A.

FIG. 11 is a view illustrating a display example of a score in the view mode of a score displaying apparatus 1B according to a third embodiment of the present invention.

FIG. 12 is a view illustrating a display example of a score on which writing is performed in a conventional score displaying apparatus.

FIG. 13 is a view illustrating a display example of the score when grand staves of FIG. 12 are re-displayed together in one grand staff in a conventional score displaying apparatus.

FIG. 14 is a diagram illustrating a configuration of a score displaying apparatus 1C according to a fourth embodiment of the present invention.

FIG. 15 is a flowchart illustrating a process performed by a controller 11 of the score displaying apparatus 1C.

FIG. 16A is a view illustrating a display example before enlargement of a grand staff which is a target of writing in the score displaying apparatus 1C.

FIG. 16B is a view illustrating a display example after enlargement of the grand staff.

FIG. 17A is a view illustrating another display example before enlargement of a grand staff which is a target of writing in the score displaying apparatus 1C.

FIG. 17B is a view illustrating a display example after enlargement of the grand staff.

FIG. 18 is a flowchart illustrating a process performed by a controller 11 of a score displaying apparatus 1D according to a fifth embodiment of the present invention.

FIG. 19 is a view illustrating a display example of a score in the view mode of a score displaying apparatus 1A according to a second embodiment of the present invention.

FIG. 20 is a view illustrating a display example of a score in the view mode of a score displaying apparatus 1B according to a third embodiment of the present invention.

FIG. 21 is a flowchart illustrating a process performed by a controller 11 of a score displaying apparatus 1E of a modification example (9) of the present invention.

FIG. 22 is a view illustrating a display example of a score in the view mode of a score displaying apparatus combining a mode of changing a display size in every grand staff and a mode of changing the display size in every bar according to a modification example (2) of the present invention.

FIG. 23 is a view illustrating another display example of a score in the view mode of a score displaying apparatus combining a mode of changing a display size in every grand staff and a mode of changing the display size in every bar according to a modification example (2) of the present invention.

FIG. 24 is a diagram illustrating functions of respective components of the score displaying apparatus 1 of the first embodiment of the present invention.

DESCRIPTION OF EMBODIMENTS

Hereinafter, embodiments of the present invention will be described with reference to the drawings.

<First Embodiment>

FIG. 1 is a block diagram illustrating a configuration of a score displaying apparatus 1 according to a first embodiment of the present invention. The score displaying apparatus 1 has a controller 11, a user interface (hereinafter referred to as a user I/F) 12, a volatile storage 13, a non-volatile storage 14, and a bus 15 which mediates data transmission and reception among these components.

The user I/F 12 is a touch panel for example. The user I/F 12 has a display function to display information indicated by various data or the like on a screen, and an input function to accept an operation such as a touch by a user and give data representing the operation to the controller 11. Note that data representing the operation is data indicating a tap position when it is a tap operation, or data indicating a flick direction and a flick amount when it is a flick operation. That is, the user I/F 12 combines the role of a display portion and the role of an input portion.

The controller 11 is a CPU (Central Processing Unit) for example. The controller 11 is a control center configured to control the units of the score displaying apparatus 1 by executing a program stored in the non-volatile storage 14.

The volatile storage 13 is a RAM (Random Access Memory) for example. The volatile storage 13 is used as a work area by the controller 11. The non-volatile storage 14 is, for example, a flash memory or a hard disk drive, and is a storage device configured to store information of various programs and the like. The non-volatile storage 14 stores a score display program 141, score data 20, and writing data 30 which are peculiar to this embodiment.

The score display program 141 is a main program of the score displaying apparatus 1. The controller 11 executes the score display program 141 to thereby enable a computer such as a tablet terminal to function as the score displaying apparatus 1. The controller 11 operates in a view mode or a writing mode according to the score display program 141. The view mode is a control mode for performing a control to display a score on a screen of the user I/F 12. The writing mode is a control mode for obtaining information indicating writing of a comment or the like to the score via the user I/F 12. The user can refer to the score displayed on the screen (or more specifically, can refer to the score for performing music) in the view mode, or can write a comment or the like on the screen via the user I/F 12 in the writing mode. Processes executed by the controller 11 according to the score display program 141 will be described in detail in a description of operation.

The score data 20 is image data of a score to be displayed on the screen of the user I/F 12. The score data 20 is divided into a plurality of blocks so that an image indicated by the score data 20 is sectioned by every predetermined area. In this embodiment, the score data 20 is divided into a plurality of blocks so that the score image is sectioned by every grand staff.

This will be described in more detail. FIG. 2 is a conceptual diagram illustrating a structure of the score data 20. In FIG. 2, the score data 20 is illustrated as a picture image. In the example of FIG. 2, a plurality of grand staves are arranged in a vertical direction. As illustrated in FIG. 2, the score data 20 is divided into a plurality of blocks, the blocks being an image area 22. To each image area 22, a number k (k=1, 2, . . . j−1, j, j+1 . . . ) is given for distinguishing it. Note that when each image area is distinguished, it is described as an image area 22*j* or the like. Each image area 22 is constituted of a grand staff part 24, an upper margin 26, and a lower margin 28. The grand staff part 24 is an area from a top line to a bottom line of the grand staff. The upper margin 26 is an area above the top line of the grand staff, and when there is another grand staff above the top line of the grand staff, it is an area from the bottom line of a grand staff higher by one level than the staff to the top line of the grand staff. The lower margin 28 is an area below the bottom line of the grand staff, and when there is another grand staff below the bottom line of the grand staff, it is an area from the bottom line of the grand staff to the top line of a grand staff lower by one level than the grand staff: When there is an image area 22*j*−1 higher by one level than the image area 22*j*, the upper margin 26 of the image area 22*j* overlaps with the lower margin 28 of the image area 22*j*−1 higher by one level than the image area 22*j*. When there is an image area 22*j*+1 lower by one level than the image area 22*j*, the lower margin 28 of the image area 22*j* overlaps with the upper margin 26 of the image area 22*j*+1 lower by one level than the image area 22*j*. Note that a music name part in the score may be handled similarly to the grand staff.

The writing data 30 is image data of a comment or the like written on the score. The writing data 30 is generated for each image area 22 of the score data 20, and is associated with the image area 22. FIG. 3 is a conceptual diagram illustrating the relation between the score data 20 and the writing data 30. In FIG. 3, the score data 20 is illustrated to be separated by every image area 22. Writing data 30*j* is image data representing a comment written on a score image indicated by score data 20*j* in the image area 22*j*. Similarly, writing data 30*j*+1 is image data representing a comment written on a score image indicated by score data 20*j*+1 in the image area 22*j*+1, and writing data 30*j*+2 is image data representing a comment written on a score image indicated by score data 20*j*+2 in the image area 22*j*+2. Then, the writing data 30*j* is associated with the image area 22*j*, the writing data 30*j*+1 is associated with the image area 22*j*+1, and the writing data 30*j*+2 is associated with the image area 22*j*+2. The same applies to writing on a score image indicated by score data 20 in another image area 22. Further, the size of the picture image of each writing data 30 is the same as the size of each associated image area 22. Further, parts other than the comment written in the picture image of the writing data 30 are transparent.

FIG. 4 is a conceptual diagram illustrating a data structure of the writing data 30. As illustrated in FIG. 4, each set of writing data 30 includes a score identifier 34, an image area number 36, and image data 38. The score identifier 34 is information indicating the score data 20 to which the writing data 30 is associated (for example, a file name of the score data 20, or the like). By this score identifier 34, the score data 20 and the writing data 30 are associated. The image area number 36 is information indicating the number of each image area 22 to which the writing data 30 is associated. By this image area number 36, the image area 22 of the number and the writing data 30 are associated. The image data 38 is information indicating a written comment. The image data 38 may be a data series of raster data like a bit map or may be a data series of vector data (for example, data of a coordinate system for drawing a Bezier curve, or the like). Further, the image data 38 may be a data series of data indicating a figure, or may be a data series of a text. Further, the image data 38 may be a data series combining raster data and vector data (or a data series including both raster data and vector data), or may be a data series combining data indicating a 15 figure and text data (or a data series containing both data indicating a figure and text data).

This concludes the configuration of the score displaying apparatus 1.

Next, operation of the score displaying apparatus 1 and a mode of use by a user will be described.

Upon using the score displaying apparatus 1, the user first prepares score source data to be the source of score data according to this embodiment in advance. The score source data is image data of a score of, for example, a PDF (Portable Document Format) file or the like. The score source data may be obtained via a network or may be obtained by reading from a paper medium via a scanner or the like. Further, a score image obtained by rendering a music XML (file format for score notation in the XML (eXtensible Markup Language) format) file may be used as the score source data, or a score image obtained by rendering a score file created by notation software (software for editing a score to an easily readable score) may be used as the score source data.

The controller 11 of the score displaying apparatus 1 starts execution of a score display program 141 in response to an instruction from the user. For example, the controller 11 starts execution of the score display program 141 in response to a tap on an icon indicating the score display program 141 on the screen of the user I/F 12. FIG. 5 is a flowchart illustrating a process performed by the controller 11. First, the controller 11 allows the user to select a score to be displayed on the screen of the user I/F 12 (SA110). Specifically, the controller 11 displays on the screen a list of the score data 20 stored in the non-volatile storage 14 as a list of displayable scores. Next, the controller 11 judges whether a score is selected or not (SA120). When no score is selected (No in SA120), the controller 11 judges whether generation of new score data 20 is instructed or not (SA130).

When generation of new score data 20 is instructed (Yes in SA130), the controller 11 allows the user to select a set of score source data (SA140). When score source data is selected, the controller 11 analyzes the selected score source data (SA150). By this analysis, elements such as grand staves, bars, notes, symbols, and so on in the score source data are recognized. Regarding the analysis of score source data, a conventional art, for example, the arts disclosed in the publications of JP H05(1993)-035924 A, JP H06(1994)-102869 A, JP H06(1994)-102870 A, JP H06(1994)-102871 A, or the like may be used. Next, the controller 11 generates score data 20 from the score source data analyzed in step SA150 and writes the score data 20 in 25 the non-volatile storage 14 (SA160). Describing more specifically, the controller 11 sections the score source data, from which grand staves and so on are recognized by the analysis, into blocks corresponding to a plurality of respective image areas 22 based on the recognized grand staves and so on, and numbers them with respect to the respective image areas 22. Thus, the score data 20 is generated. When the new score data 20 is generated, the controller 11 returns to step SA110 and allows the user to select a score to be displayed on the screen of the user I/F 12 including the new score data 20. Note that when there is no instruction to generate new score data 20 (No in SA130), the controller 11 returns to the process of step SA120.

When a score is selected in step SA120 (Yes in SA120), the controller 11 first reads the score data 20 corresponding to the selected score (SA170) from the non-volatile storage 14. Next, the controller 11 reads the writing data 30 associated with the read score data 20 from the non-volatile storage 14 (SA180). Specifically, the controller 11 reads the writing data 30 having the score identifier 34 corresponding to the read score data 20. Next, the controller 11 displays an image of the writing data 30 on the screen of the user I/F 12 by overlapping on an image of the read score data 20 (SA190). Specifically, the controller 11 displays, in each image area 22, an image indicated by the writing data 30 having the image area number 36 corresponding to the number given to the image area 22 by overlapping in front of an image indicated by the score data 20 in this image area 22. Further, in the portion where image areas 22 are overlapped with each other (the upper margin 26 and the lower margin 28), there are displayed an image indicated by the score data 20 in one image area 22 by overlapping in front of an image indicated by the score data 20 in another image area 22, an image indicated by the writing data 30 having the image area number 36 corresponding to the number given to the one image area 22 by overlapping in front of these images, and moreover, an image indicated by the writing data 30 having the image area number 36 corresponding to the number given to the other image area 22 by overlapping in front of these images. Thus the selected score is displayed on the screen in the view mode.

FIG. 6 is a view illustrating a display example of a score in the view mode. In the view mode, a plurality of grand staves are displayed on the screen of the user I/F 12. In the example of FIG. 6, grand staves of two pages are displayed. Further, when the user flicks the screen leftward, grand staves of the next two pages are displayed, or when the user flicks rightward, grand staves of the previous two pages are displayed. Note that the display style in the view mode is not limited to the display example illustrated in FIG. 6.

Next, writing on the score will be described. When starting writing on the score, the user specifies a grand staff to which the user desires to write, from among a plurality of grand staves displayed in the view mode on the screen of the user I/F 12. For example, when the user desires to write on the third grand staff from the top of the left page in FIG. 6, the user performs a long tap (touch and hold) on the portion of the screen where the third grand staff on the left page is displayed. At this time, the position where the long tap should be performed may be any position as long as it is in the portion where the grand staff on which writing is desired (the third grand staff) is displayed. Note that the operating method to specify the writing position is not limited to the long tap. For example, the writing position may be specified by an operation such as a double tap.

FIG. 7 is a flowchart illustrating a process performed according to the score display program 141 by the controller 11 which received an instruction to start writing on the score from the user I/F 12. First, the controller 11 recognizes the image area 22 to which the grand staff specified by the user belongs as an image area 22 which is a target of writing (hereinafter referred to as "target image area") (SB110). This will be described in more detail. For example, when the score is displayed on the screen in the view mode, the controller 11 determines a reference coordinate of each image area 22 (for example, a coordinate position occupied by the top left corner of the screen) in a coordinate system of the screen (for example, a coordinate system originated at the top left corner of the image area 22). From this position of the reference coordinate of each image area 22 and the size of each image area 22, the controller 11 can recognize what image area 22 each position on the screen corresponds to. Therefore, the controller 11 can recognize the image area 22 corresponding to the position where a long tap is performed on the screen.

Next, the controller 11 performs a process of enlarging an image of the score data 20 in the recognized image area 22 and an image of writing data 30 associated therewith to a size appropriate for writing (SB120). Next, the controller 11 performs a process of displaying the enlarged image of the score data 20 and the enlarged image of the writing data 30 on the foreground of a center of the screen of the user I/F 12 (SB130). At this time, there is similarly enlarged and displayed an image of writing data 30 of a portion overlapping with the target image area 22*j* in the image area 22*j*−1 (or 22*j*+1) adjacent to the target image area 22*j*. Thus, when there is already writing on the portion overlapping with the target image area 22*j* in the image area 22*j*−1 (or 22*j*+1) adjacent to the target image area 22*j*, writing with poor visibility overlapping with the already existing writing is prevented. Further, the display style of the writing already existing in the portion overlapping with the target image area 22*j* in the image area 22*j*−1 (or 22*j*+1) adjacent to the target image area 22*j* may be different from the display style of writing in the target image area 22*j*. For example, the writing on the adjacent image area 22*j*−1 (or 22*j*+1) is displayed in a pale color (for example, gray or the like), and the writing on the target image area 22*j* is displayed in a deep color (for example, black or the like). As another example, the colors may be changed such that the writing on the adjacent image area 22*j*−1 (or 22*j*+1) is displayed in blue and the writing on the target image area 22*j* is displayed in black. As still another example, the writing on the adjacent image area 22*j*−1 (or 22*j*+1) is displayed by flashing and the writing on the target image area 22*j* is displayed by not flashing. By changing the display style of writing, the user can easily distinguish that writing is in what image area 22 (that is, what grand staff).

FIG. 8 is a view illustrating an example of a state that an image of the target image area 22 is enlarged and displayed. As illustrated in FIG. 8, only the image inside the image area 22*j* to which the grand staff specified by the user (the third grand staff from the top on the left page in FIG. 6) belongs is enlarge-displayed on the foreground, and images in other image areas 22 are not enlarge-displayed thereon. Further, in the example illustrated in FIG. 8, in the vicinity of an upper boundary of the image of the enlarge-displayed image area 22*j*, notes and so on protruding downward from the bottom line of the grand staff in the image area 22*j*−1 higher by one level than the image area 22*j* are displayed. Further, in the vicinity of a lower boundary of the image of the enlarge-displayed image area 22*j*, notes and so on protruding upward from the top line of the grand staff in the image area 22*j*+1 lower by one level than the image area are displayed. Thus, by displaying notes and so on protruding from the bottom line of the grand staff higher by one level or the top line of the grand staff lower by one level, writing with poor visibility overlapping with protruding notes and so on can be prevented. Note that in enlarge-display of an image of the target image area 22*j*, it may be configured not to display notes and so on protruding from the bottom line of the grand staff higher by one level or the top line of the grand staff lower by one level.

The controller 11 performs a process of switching the control mode from the view mode to the writing mode subsequently to the above-described enlarge-display process (SB140). Specifically, the controller 11 thereafter accepts an operation such as a touch inside the area on the screen corresponding to the image enlarged and displayed at the center of the screen as an input operation of information indicating writing. Thus, one feature of the score displaying apparatus 1 according to this embodiment is to perform a process of displaying the score such that the image inside the target area on which writing is to be accepted in the score is relatively enlarged in comparison with the image outside the area, and a process of switching from the view mode to the writing mode, in response to one operation (specifically, a long tap specifying the target image area 22) given to the input portion. This one operation means one time of operation. That is, the score displaying apparatus 1 of the embodiment performs the process of the enlarge-display and the process of the switching to the writing mode not separately in response to a series of separate operations but at once in response to one time of common operation.

In the writing mode, writing is possible only in the image area 22*j* enlarged on the screen. The user writes a comment with letters, symbols, and/or the like in the image area 22*j* by sweeping the inside of the image area 22*j* on the screen with a finger, or the like. Note that the method of writing in the image area 22*j* by the user is not limited to the style of sweeping the inside of the image area 22*j* with a finger. For example, the writing position in the image area 22*j* may be specified by a tap or a mouse, and letters, symbols, and/or the like may be written in the specified writing position (for example, written as a text) by operating a mouse, a keyboard (or software keyboard) or the like. Further, the writing may be performed over the entire target image area 22*j* (that is, the entire grand staff of the image area 22*j*), or may be performed in a portion of the target image area 22*j* (for example, a part of bars, a part of notes, or the like in the image area 22*j*).

In the writing mode, the controller 11 judges whether or not an end instruction of the writing mode is obtained (SB150). For example, the controller 11 judges that the end instruction of the writing mode is obtained when a tap on an outside portion of the target image area 22*j* on the screen is detected. While the end instruction of the writing mode is not obtained (No in SB150), once obtained information indicating writing (SA160), the controller 11 stores the information indicating the writing in the volatile storage 13 (SB170). When the end instruction of the writing mode is obtained (Yes in SB150), the controller 11 reads a content written in the image area 22*j* from the volatile storage 13, and adds the content to the writing data 30*j* associated with the image area 22*j* and then stores the writing data 30*j* in the non-volatile storage 14 (SB180). Next, the controller 11 performs a process of switching the control mode from the writing mode to the view mode (SB190). Specifically, the controller 11 thereafter does not accept an operation such as a touch within the area on the screen corresponding to the image enlarged and displayed on the center of the screen as the input operation of information indicating writing. Next, the controller 11 finishes the enlarge-display of the image inside the target area (SB200). Then, the controller 11 performs a view mode display reflecting the content written in the writing mode (SB210).

Thus, this embodiment focuses on writing, and the image area 22 accepting this writing is assumed as a focused area. Then, in the score displaying apparatus 1 according to this embodiment, by one operation by the user, the image inside the image area 22 of the score accepting writing is relatively enlarged and displayed in comparison with an image outside the image area 22 accepting writing, and the view mode is switched to the writing mode. Moreover, by one operation by the user, the enlarge-display is released, and the writing mode is switched to the view mode. Thus, the user can write on the score in three steps of an operation to specify a grand staff on which writing is desired, a writing operation, and an operation to finish writing. The user can thereby write on the score by less operation in comparison with conventional score displaying apparatuses. Further, the user performs a writing operation inside the enlarge-displayed image area 22. Then, the written content is stored in association with the enlarge-displayed image area 22. Thus, movement of the written content on the score to an irrelevant position by reflow or the like will not happen. Therefore, the score displaying apparatus 1 according to this embodiment can be said to be more convenient in comparison with conventional score displaying apparatuses.

FIG. 24 is a diagram illustrating functions of respective components of the score displaying apparatus 1 of this embodiment. The user I/F 12 of the score displaying apparatus 1 has a display function and an input function. More specifically, the user I/F 12 has a function to display a score, a function to obtain writing on the score, and a function to obtain one operation on an image inside the target area on which writing is to be accepted. Further, the controller 11 of the score displaying apparatus 1 has a score data generating function, a view mode function to display a score, a writing mode function to obtain information indicating writing via the input portion, and a function to perform enlarge-display of an image inside the target area on which writing is to be accepted and mode switching from the view mode to the writing mode, in response to one operation. In the score displaying apparatus 1, by the controller 11 executing the score display program, these functions are realized in the controller 11 and the user I/F 12.

<Second Embodiment>

In the score displaying apparatus 1 according to the first embodiment, convenience of writing on a score is improved. On the other hand, in a score displaying apparatus 1A according to a second embodiment, convenience in the view mode is improved. The score displaying apparatus 1A according to this embodiment is different from the score displaying apparatus 1 according to the first embodiment in a processing portion of the view mode display in the score display program 141. Further, in the score displaying apparatus 1A, similarly to the score displaying apparatus 1 of the first embodiment, score data 20 is sectioned into a plurality of blocks.

FIG. 9 is a flowchart illustrating a process performed by the controller 11 of the score displaying apparatus 1A after a score to be displayed on the screen is selected (that is, a process corresponding to SA170 to SA190 of FIG. 5). The controller 11 reads score data 20 and writing data 30 (SC110). Note that the writing data 30 is the same as that of the first embodiment. Next, the controller 11 determines a focused area in the score (SC120). In other words, the controller 11 determines any one block among the sectioned blocks of the score data 20 as the focused area. The focused area in this embodiment is not limited to a target image area on which writing is to be accepted as in the first embodiment, but refers to an area focused by a user in the score. As a specific example of the focused area in this embodiment, there is a focused grand staff. The focused grand staff is, for example, a grand staff specified by the user or a grand staff including notes corresponding to a current musical performance. Details of a method of specifying the focused grand staff will be clarified later. Note that when a musical performance is not started, the first (highest level) grand staff in the score may be determined as the focused grand staff. Next, the controller 11 determines ten grand staves in total from the grand staff determined as the focused grand staff to the ninth grand staff located forward of (below) the focused grand staff as display target grand staves (SC130). In other words, the controller 11 determines as display target areas a plurality of blocks including one block determined as the focused area. Note that in this embodiment, a grand staff located forward on a timeline of the score from the focused grand staff will be called a forward grand staff, and a grand staff located backward on the timeline of the score from the focused grand staff will be called a backward grand staff. Note that the timeline of the score in this specification is an axis in a beating direction of notes, is an axis in a direction of time flow of a melody, and refers to an axis in a direction along each lateral line in the grand staff. Next, the controller 11 performs a process of enlarging the image inside the focused area in comparison with the image outside the focused area, and gradually reducing an image of a surrounding area of the focused area with distance from the focused area. Specifically, regarding the grand staff as the display target, the controller performs a process of enlarging the image of the focused grand staff in comparison with the image outside the focused grand staff, and reducing the image gradually as proceeding from the focused grand staff to forward grand staves (SC140). At this time, the amount of reducing the image is increased as proceeding to the forward grand staves. Then, the controller 11 performs a process of displaying the grand staves as the display target on the screen (SC150). At this time, the controller 11 performs a display process so that the focused grand staff is displayed at the highest level in the screen, the first grand staff located forward of the focused grand staff is displayed lower by one level than the image of the focused grand staff, the second grand staff located forward of the focused grand staff is displayed lower by one level than the image of the first grand staff, and so on . . . , and the ninth grand staff located forward of the focused grand staff is displayed lower by one level than the image of the eighth grand staff. Further, when the focused grand staff changes by proceeding of the musical performance, the controller 11 repeats the processes of steps SC120 to SC150.

FIG. 19 is a view illustrating a display example of a score in the view mode of the score displaying apparatus 1A according to this embodiment. D1 to D7 of FIG. 19 each denote a grand staff. As illustrated in FIG. 19, among the displayed grand staves, the grand staff at the highest level is enlarged and displayed to be largest, and grand staves are reduced and displayed as proceeding downward. Moreover, as proceeding from the focused grand staff (the grand staff at the highest level) to forward grand staves (lower grand staves), the image thereof is displayed to curve toward the depth of the screen. That is, in this embodiment, an image like seeing a score adhered on the rolling surface of a roll is displayed on the screen.

Next, details of the method of specifying the focused grand staff will be described. When the controller 11 is made to function as a performance position recognizing portion configured to recognize the current performance position of the user on the score, the grand staff corresponding to the current performance position may be set to the focused grand staff. Specifically, whether or not there is input of a sound signal at a predetermined level or more via a microphone is judged by the controller 11. When it is judged that there is input of a sound signal at the predetermined level or more, the controller 11 detects periodically repeated waveforms from this sound signal and measures the period of a waveform thereof to calculate a pitch. The controller 11 stores calculated pitches as pitch information in a time series in the volatile storage 13. Then, the controller 11 matches the pitch information calculated from the sound signal with pitch information indicated by notes in the score data, and assumes that the portion in the score data which has the highest match with the pitch information calculated from the sound signal as the current performance position. Note that by retaining score data as logical score data having a meaning of sound, pitch information indicated by notes in the score data can be obtained. In this mode, when the grand staff to which the current performance position belongs changes accompanying progress of the musical performance, the image of the grand staves is scrolled as if a roll rotates in an upward or downward direction on the screen. For example, in a state that the first grand staff is displayed at the highest level of the screen and the second grand staff is displayed therebelow, when the current performance position changes from the first grand staff to the second grand staff, the first grand staff is no longer displayed, the second grand staff is displayed at the highest level of the screen, and the third grand staff is displayed in the second position from the top. Then, the grand staff corresponding to the current performance position is constantly displayed largely at the highest level on the screen, and the grand staves from this grand staff to a predetermined number of forward grand staves are displayed in a gradually reducing manner.

When the controller 11 is made to function as a score automatic proceeding portion configured to automatically proceed the current position of note on the score along the timeline of the score, the grand staff to which the current note position belongs may be determined as the focused grand staff. When the user gives an instruction to start automatic proceeding of score, the controller 11 sequentially proceeds the current position of note according to tempo information included in the score data from the first note to the last note in the score data, and determines the grand staff to which the current position of note belongs as the focused grand staff. Then, similarly to the above description, as the current position of note proceeds and the focused grand staff changes, the image of the grand staves is scrolled in the upward or downward direction on the screen.

Further, the score displaying apparatus 1A may be configured to be able to change the focused grand staff by a user's operation. For example, the focused grand staff changes by a flick or swipe in the upward or downward direction on the screen performed by the user. This will be described in more detail. Once detected an upward flick operation by the user, the controller 11 determines the grand staff located forward by the amount corresponding to the flick operation with reference to the current focused grand staff as a new focused grand staff. Then, similarly to the above description, the image of the grand staves are scrolled in an upward direction on the screen, and the grand staff newly determined as the focused grand staff is displayed as the focused grand staff at the highest level on the screen. Similarly, once detected a downward flick operation by the user, the controller 11 determines the grand staff located backward by the amount corresponding to the flick operation with reference to the current focused grand staff as a new focused grand staff. Then, similarly to the above description, the image of the grand staves are scrolled in a downward direction on the screen, and the grand staff newly determined as the focused grand staff is displayed at the highest level on the screen. In this mode, the display of the grand staves can be proceeded in a forward direction of the music by an upward flick by the user, and the display of the grand staves can be returned in a backward direction of the music by a downward flick by the user. Note that the operation to change the focused grand staff is not limited to the flick.

When performing music while looking at a score, normally, the performer looks at the notes or the like corresponding to the current performance position, and also looks at notes or the like located forward of the current performance position. This is for grasping an event located forward of the present in advance. For example, when there is a difficult phrase in the forward eighth bar, one prepares in mind for the phrase, or when there is another part (song or the like) comes in the forward 16th bar, one prepares in mind for this part. When music is performed, it is preferred that an event existing sufficiently forward be grasped in advance. On the other hand, the more proceeding forward from the present, the more it is sufficient that notes and the like are roughly grasped. Accordingly, in this embodiment, grand staves located forward of the focused grand staff are reduction-displayed, enabling to display up to a sufficiently forward grand staff:

In this manner, the score displaying apparatus 1A according to this embodiment enlarges and displays the image inside the focused area in the score, and reduces and displays the image of the area in the vicinity of the focused area with distance from the focused area. That is, the image inside the focused area is displayed by relatively enlarging in comparison with the image outside the focused area. Specifically, among a plurality of grand staves as the display target, the focused grand staff is enlarged and displayed to be largest, and other grand staves are reduced and displayed as proceeding from the focused grand staff to forward grand staves. Since the grand staves located forward of the focused grand staff are reduction-displayed, grand staves in a wide range located forward of the focused grand staff can be displayed. Accordingly, the user can visually clearly recognize notes and the like on the focused grand staff, and can grasp an event existing forward of the focused grand staff in advance up to a sufficiently forward grand staff. Then, by determining the grand staff to which the current performance position belongs as the focused grand staff, the user can perform music while grasping an upcoming phrase or the like up to a sufficiently forward bar in advance and while visually clearly recognizing notes and the like around the current performance position on the score. Thus, the score displaying apparatus 1A of this embodiment can be said to be more convenient in comparison with conventional score displaying apparatuses.

Note that the degree of reducing grand staves located forward of the focused grand staff is not limited to that exemplified in FIG. 19. Further, the degree of reduction may be appropriately set according to the screen size of the user I/F 12, the contents of the score to be displayed, or the like. Further, in FIG. 19, an example of displaying seven grand staves in total from the focused grand staff to the forward sixth grand staff is illustrated, but the number of displayed grand staves is not limited to seven. Further, not being limited to scores represented by a plurality of grand staves, the features of this embodiment may be applied to a part represented by a plurality of staff notations as illustrated in FIG. 10. This mode can be realized by making each staff notation of the part correspond to each grand staff of FIG. 19. In addition, the features of this embodiment may of course be applied to any other score besides the score represented by a plurality of grand staves and the part represented by a plurality of staff notations.

<Third Embodiment>

In a score displaying apparatus 1B according to a third embodiment, convenience in the view mode is improved similarly to the second embodiment. FIG. 20 is a view illustrating a display example of a score in the view mode of the score displaying apparatus 1B according to this embodiment. The score displaying apparatus 1B according to this embodiment is different from the score displaying apparatus 1A according to the second embodiment in the reduction display style when grand staves located forward of the focused grand staff are reduced and displayed as proceeding to the forward grand staves.

As illustrated in FIG. 20, the controller 11 of this embodiment divides a grand staff image into strips by every grand staff and displays them. Further, the controller 11 displays the focused grand staff at a highest level of the screen, and displays images of grand staves located forward of the focused grand staff at lower levels as proceeding to the forward grand staves. Further, the controller 11 displays the image of the focused grand staff by enlarge-displaying to be largest, and reduction-displays the grand staves located forward of the focused grand staff stepwise as proceeding to the forward grand staves. Further, the controller 11 displays the focused grand staff on the foreground of the screen and, as proceeding to the grand staves located forward of the focused grand staff, displays images of the grand staves so that a part thereof hides behind an image of a grand staff in front thereof. At this time, the amount of hiding behind the front grand staff is increased as proceeding to forward grand staves. That is, in this embodiment, images of grand staves are seen as gondolas of a Ferris wheel, and an image as if seeing a side of the Ferris wheel from a lower side is displayed on the screen. Note that it may be in a display style such that a part of an image of a forward grand staff is not hidden behind an image of another grand staff in front thereof.

Since the score displaying apparatus 1B is similar to the score displaying apparatus 1A according to the second embodiment excluding that the reduction display style is different, effects similar to those of the second embodiment can be obtained also in this embodiment.

Further, in the score displaying apparatus 1B of this embodiment, an image of a grand staff located forward of the focused grand staff is not curved, and thus notes and the like in the forward grand stave are not distorted. An effect that it is easy to grasp the notes and the like in the forward grand stave in comparison with the second embodiment can be obtained.

Further, not being limited to scores represented by a plurality of grand staves, the features of this embodiment may be applied to a part represented by a plurality of staff notations as illustrated in FIG. 11. This mode can be realized by making each staff notation of the part correspond to each grand staff of FIG. 20. In addition, the features of this embodiment may of course be applied to any other score besides the score represented by a plurality of grand staves and the part represented by a plurality of staff notations.

<Fourth Embodiment>

FIG. 14 is a diagram illustrating a configuration of a score displaying apparatus 1C according to a fourth embodiment of the present invention. The score displaying apparatus 1C is different from the score displaying apparatus 1 according to the first embodiment in that staff interval data 40 and enlarged staff interval data 50 are stored in the non-volatile storage 14, and that the score displaying apparatus 1C has a score display program 141C instead of the score display program 141. The score displaying apparatus 1C of this embodiment calculates appropriate magnification of an image in the writing mode relative to an image in the view mode, from an interval of staff in the view mode and an interval of staff in the writing mode. In this specification, the interval of staff refers to a distance between adjacent lines in a staff notation.

The staff interval data 40 is data indicating the interval of staff in every grand staff in score data 20. The staff interval data 40 is generated together with the score data 20 from analyzed score source data. The staff interval data 40 is generated for each image area 22 and is associated with the image area 22, similarly to writing data 30.

The enlarged staff interval data 50 is data indicating an interval of staff in a grand staff enlarge-displayed on the screen when the score displaying apparatus 1C is in the writing mode. The enlarged staff interval data 50 is set in advance so that the display size of the enlarge-displayed grand staff becomes an easily writable size for a user. Further, the enlarged staff interval data 50 is changeable by a user via the user I/F 12 or the like.

FIG. 15 is a flowchart illustrating a process of the score display program 141C executed by the controller 11 of the score displaying apparatus 1C. As is clear from comparing FIG. 15 with FIG. 7, the score display program 141C is different from the score display program 141 in that it has steps SD110 to SD140 instead of step SB120. Note that the description of step SB150 and so on of FIG. 7 is omitted in FIG. 15.

The controller 11, after recognizing an image area 22 to which a grand staff specified by the user belongs as a target image area 22 (SB110), first reads the staff interval data 40 associated with the target image area 22 from the non-volatile storage 14 (SD110). Next, the controller 11 reads the enlarged staff interval data 50 from the non-volatile storage 14 (SD120). Then, the controller 11 calculates the magnification from the read staff interval data 40 and the enlarged staff interval data 50 (SD130). Calculation of the magnification will be described in detail later. Subsequent to step SD130, the controller 11 performs a process of enlarging an image of the score data 20 in the target image area 22 and an image of writing data 30 associated therewith by the magnification obtained by the calculation (SD140). Thereafter, the controller 11 displays the enlarged image on the foreground of the center of the screen (SB130), and switches from the view mode to the writing mode (SB140).

Calculation of the magnification will be described in detail. FIG. 16A is a view illustrating an example of displaying a part of a grand staff in a normal display size (size before being enlarge-displayed) in the view mode. In the example of FIG. 16A, the interval of the staff, namely, the staff interval data 40 is da. FIG. 16B is a view illustrating an example of enlarge-displaying a part (specifically, a part illustrated in FIG. 16A) of the grand staff on which writing is to be accepted (hereinafter referred to as "target grand staff") while switching to the writing mode. In the example of FIG. 16B, the interval of the staff, namely, the enlarged staff interval data 50 is du. Magnification ra of the target grand staff in the examples of FIG. 16A and FIG. 16B can be obtained by formula (1).

$$ra=du/da \tag{1}$$

Incidentally, the normal display size in the view mode of the grand staff differs in every score data 20. This is because the score size of the score source data differs in every score. FIG. 17A is a view illustrating another example of displaying a part of a grand staff in the normal display size in the view mode. In the example of FIG. 17A, the interval of the staff, namely, the staff interval data 40 is db. The size of the grand staff of FIG. 17A is smaller than the size of the grand staff of FIG. 16A. Accordingly, regarding the staff interval data 40, db is smaller than da.

FIG. 17B is a view illustrating another example of enlarge-displaying a part (specifically, a part illustrated in FIG. 17A) of the target grand staff while switching to the writing mode. The grand staff of FIG. 17B is the same size as the grand staff of FIG. 16B. Accordingly, the interval of the staff of FIG. 17B, namely, the enlarged staff interval data 50 is du similarly to that of FIG. 16B. Magnification rb of the target grand staff in the examples of FIG. 17A and FIG. 17B can be obtained by formula (2).

$$rb=du/db \tag{2}$$

As exemplified in the formula (1) and formula (2), the controller 11 obtains the magnification of the target grand staff by dividing the enlarged staff interval data 50 by the staff interval data 40 in step SD130.

As described above, in the score displaying apparatus 1C of this embodiment, the enlarged staff interval data 50 is set in advance so that the display size of the target grand staff in the writing mode is an easily writable size for the user. Then, in the score displaying apparatus 1C, the target grand staff is enlarge-displayed by the magnification obtained by dividing the enlarged staff interval data 50 by the staff interval data 40. Accordingly, a grand staff with small staff interval data 40 (in other words, the display size of the grand staff is small) is enlarge-displayed by large magnification, and a grand staff with large staff interval data 40 (in other words, the display size of the grand staff is large) is enlarge-displayed by small magnification. That is, in the score displaying apparatus 1C, irrespective of the display size of grand staff of the score data 20, the target grand staff is always enlarge-displayed in a specific display size which is easily writable. More specifically, the target grand staff in the score data 20 of a score and the target grand staff in the score data 20 of a part having a notation size different from that of the score are displayed in the same display size in the writing mode. Further, since the target grand staff is enlarge-displayed constantly in a certain size when writing is performed, the user can easily write without adjusting the display size.

Note that in the score displaying apparatus 1C of this embodiment, the magnification of the target grand staff is calculated with the interval of staff. However, the mode of calculating the magnification of the target grand staff is not limited to this. This is because magnification of a grand staff can be calculated with any information as long as it is related to the display size of score. As the information related to the display size of score, for example, a display size (font size) of music symbol such as a note head of a note or a rest, the number of grand staves displayed on the screen in the view mode, or the like can be used.

<Fifth Embodiment>

In the score displaying apparatus 1 according to the first embodiment, when it is switched from the view mode to the writing mode, an image inside the target image area is enlarged, and the entire enlarged image is displayed on the screen. However, when the size of the screen is small, there is a concern that the image cannot be enlarged to an easily writable size if the entire image after enlargement should be displayed on the screen. To avoid such a situation, it is conceivable to enlarge the image inside the target image area to an easily writable size, display at least a part of the enlarged image on the screen, and not to display the other part on the screen. In a score displaying apparatus 1D according to a fifth embodiment of the present invention, convenience when a part of an image inside the target image area is enlarge-displayed on the screen is improved. The score displaying apparatus 1D is similar to the score displaying apparatus 1 of the first embodiment excluding a part of the score display program.

FIG. 18 is a flowchart illustrating a process performed by the controller 11 of the score displaying apparatus 1D according to this embodiment. FIG. 18 has step SE110 instead of step SB130 of FIG. 7, and steps SE120 and SE130 are added between steps SB140 and SB150. Note that the description of step SB190 and so on of FIG. 7 is omitted in FIG. 18. The controller 11 of the score displaying apparatus 1D, after performing a process of enlarging an image of the score data 20 and an image of the writing data 30 to an easily writable size (SB120), displays at least a part of the enlarged image on the foreground of a center of the screen (SE110). That is, the controller 11 displays the image of a part of the target image area 22.

The controller 11 of the score displaying apparatus 1D judges whether or not a scroll instruction is obtained in the writing mode (SE120). For example, the controller 11 judges that the scroll instruction is obtained when a touch pen is brought close to the screen of a touch panel and a movement of the pen point thereof toward an end of the screen is detected. When the scroll instruction is obtained (Yes in SE120), the controller 11 scrolls the enlarged image of the target image area 22 which is being displayed (SE130). More specifically, the controller 11 moves a display area to be displayed on the screen among the target image area 22 according to the scroll instruction. For example, when detecting a movement of the pen point to a right end from the vicinity of the center of the screen, the controller 11 moves the display area leftward among the target image area 22. Similarly, when detecting movements of the pen point to a top end, a bottom end, and a left end are detected, the controller 11 moves the display area downward, upward, and rightward among the target image area 22, respectively. Thus, the user can scroll the enlarge-displayed image with an operating feeling similar to a flick operation. After the screen is scrolled (SE130), the controller 11 returns to step SE120 to judge whether or not the scroll instruction is obtained again.

The controller 11 may change a moving speed (that is, the scroll speed of the enlarge-displayed image) of the display area in the target image area according to a detected moving speed of the pen point. Further, the controller 11 may change the moving speed of the display area in the target image area according to a distance between the moved pen point and an end of the screen. That is, the controller 11 may change which portion of the target image area is to be displayed at a speed according to a position on the screen at which a predetermined operation is provided by the user. For example, when detecting a movement of the pen point by the user from the vicinity of the center of the screen to the vicinity of an end (for example, right end) of the screen, the controller 11 may make the moving speed of the display area faster as the user moves the pen point closer to the end (right end) of the screen, or make the moving speed of the display area slower as the user moves the pen point away from the end (right end) of the screen.

The controller 11 performs the processes of step SB150 and so on while the scroll instruction is not obtained in the writing mode (No in SE120). The controller 11 of this embodiment repeats obtaining information indicating writing (SB160), storing the information indicating writing (SB170), and returning to step SE120 to judge whether or not the scroll instruction is obtained, while a writing end instruction is not received (No in SB150).

Thus, in the score displaying apparatus 1D according to this embodiment, a portion which has not been displayed inside the screen among the image of the target image area can be displayed in response to an operation by the user when the score displaying apparatus 1D is in the writing mode. Accordingly, the score displaying apparatus 1D can display the target grand staff in an easily writable size irrespective of the screen size, and can allow the user to write in the entire area in the target image area 22. Therefore, when performing writing, the user can write on a grand staff which is always enlarged to an easily writable size.

Note that in the score displaying apparatus 1D in this embodiment, a portion which has not been displayed on the screen in the target grand staff is displayed by scrolling. However, the style of displaying a portion which has not been displayed on the screen is not limited to the scrolling. Further, the specific mode of judging whether or not the scroll instruction is obtained is not limited to the mode of the touch pen as exemplified above. Further, the technical features of the fourth embodiment and the technical features of this embodiment may be combined.

<Other Embodiments>

The first to fifth embodiments of the present invention have been described above, but other embodiments are conceivable for this invention. Examples are given below.

(1) In the above-described first embodiment, writing by the user is allowed in each grand staff. However, the unit of allowing writing by the user is not limited to the grand staff unit. For example, writing by the user may be allowed in each bar. This is useful in a mode such that one grand staff is displayed sequentially in a lateral direction of the screen. In this mode, the score data 20 is blocked so that a score image is sectioned by every bar. Then, by one operation by the user, the controller 11 enlarges and displays an image of a specified bar on the foreground of a center of the screen, and switches the control mode to the writing mode. Since it is similar to the first embodiment excluding that writing is allowed in bar unit, effects similar to those of the first embodiment can be obtained in this mode. Further, in this mode, even when the screen size of the user I/F 12 is small, an image of a target of writing on which writing is to be accepted can be displayed in a sufficiently large size for writing. Also, as another example, writing by the user may be allowed in each page, or may be allowed in each note. When writing is allowed in each page, the score data 20 may be divided into a plurality of blocks so that the score image is sectioned by every page, or when writing is allowed in each note, the score data 20 may be divided into a plurality of blocks so that the score image is sectioned by every note. That is, the score data 20 just needs to be sectioned into a plurality of blocks such as grand staves, bars, pages, or notes.

(2) In the second and third embodiments, the display size is changed in every grand staff. However, the display size may be changed in every bar. In this mode, the controller 11 enlarges and displays a focused bar among a plurality of bars as the display target, and reduces and displays bars as proceeding to bars located forward of the focused bar. In the mode to display one grand staff sequentially in a lateral direction of the screen, the controller 11 enlarges and displays the focused bar on a viewer's left side on the screen, and reduces and displays the forward bars on the right side thereof. Also in this mode, effects similar to those of the second and third embodiments can be obtained. Further, even when the screen size of the user I/F 12 is small, the user can clearly recognize notes and the like in the vicinity of the current performance position, and the user can grasp up to a sufficiently forward bar from the focused bar in advance.

Further, a mode of changing the display size in every grand staff and a mode of changing the display size in every bar may be combined. FIG. 22 and FIG. 23 are views illustrating display examples of a score in the view mode of the score displaying apparatus in which the display styles are combined in this manner. FIG. 22 illustrates an example of displaying a score by curving as in the second embodiment. FIG. 23 illustrates an example of displaying a score stepwise as in the third embodiment. In the examples of FIG. 22 and FIG. 23, the controller 11 enlarges and displays the focused grand staff (for example, the grand staff D1) relatively larger than grand staves around the focused grand staff, and in addition, enlarges and displays a focused bar (for example, bar S2) in the focused grand staff relatively larger than bars around the focused bar in the focused grand staff. In such a mode, not only the focused grand staff can be visually clearly recognized, but also the focused bar can be visually clearly recognized in particular. Note that in FIG. 22 and FIG. 23, although the controller 11 displays a bar S3 and a bar S4 which are bars around the focused bar S2 in a substantially same size, it is of course possible to reduce and display the bars as proceeding from the focused bar to forward bars, such as relatively reducing and displaying the bar S4 in comparison with the bar S3.

(3) In the first embodiment, the grand staff on which writing is desired is specified by a long tap on the screen of the user I/F 12. However, the method of specifying the grand staff on which writing is desired is not limited to specifying from an image of the grand staff. For example, it may be a mode of specifying the grand staff on which writing is desired from sound data. In this mode, the score data may be retained as logical score data having meanings of sounds. Further, in this mode, in addition to the processes in the first embodiment, a process of specifying a grand staff based on the sound data may further be provided. For example, a grand staff is specified based on sound data by matching a sound data series with a note series of the score data. Specifically, the controller 11 in this mode may be configured to perform, in response to one operation given from an input portion, a process of specifying the target image area 22 in a score, a process of enlarging and displaying an image inside the target image area 22 in comparison with an image outside the target area, and a process of switching from the view mode to the writing mode. Also in this mode, effects similar to those of the first embodiment can be obtained.

(4) In the first embodiment, the image of the image area 22 to which the specified grand staff belongs is enlarged and displayed, and it is switched to the writing mode. However, the score displaying apparatus may have a mode of enlarging and displaying the image of the image area 22 to which the specified grand staff belongs, and meanwhile not switching to the writing mode. For example, enlarge-display and switching to the writing mode are performed when a touch by a stylus is detected, but only the enlarge-display is performed when a touch with a finger is detected. Thus, only partial enlarge-display in the score image can be performed.

(5) In the first embodiment, an instruction of enlarge-display and an instruction to release the enlarge-display are given by a direct tap on the screen, or the like. However, for example, it may be configured to perform enlarge-display when a stylus is brought close to the screen of the touch panel, or release enlarge-display when the stylus is brought away from the screen of the touch panel.

(6) In the first embodiment, each image area 22 is set so that adjacent image areas 22 overlap. Here, when information indicating an input operation corresponding to a portion where adjacent image areas overlap with each other is obtained, the controller may judge which of the adjacent image areas the information indicating an input operation is related to. For example, when a lower margin of one grand staff and an upper margin of a grand staff lower by one level therefrom overlap with each other, the controller may judge that information indicating an input operation to an upper half of the overlapping portion indicates an input operation to the one grand staff, and that information indicating an input operation to a lower half of the overlapping portion indicates an input operation to the grand staff lower by one level. Note that the mode of judging the information indicating an input operation to a portion where adjacent image areas overlap with each other is not limited to this. Further, image areas 22 may be set so that adjacent image areas 22 do not overlap. In this mode, for example, a middle of the bottom line of the upper grand staff and the top line of the lower grand staff may be used as a boundary between the adjacent image areas. Further, when a note, a symbol or the like belonging to the grand staff higher than the middle protrudes in a downward direction, or a note, a symbol or the like belonging to the grand staff lower than the middle protrudes in an upward direction, the boundary of the image areas may be corrected to the downward direction or upward direction so that the note, the symbol or the like belongs to the correct image area. Further, a portion where adjacent image areas do not overlap with each other and a portion where adjacent image areas overlap with each other may be mixed.

(7) In the second and third embodiments, the image of the focused area (that is, the focused grand staff) is enlarged. However, it will suffice to relatively enlarge at least the image inside the focused area in comparison with the image outside the focused area, and it may be a mode of not enlarging the image inside the focused area. This is because even when enlarge-display of the image of the focused area is not performed, if it is displayed in a normal size, the user can recognize the image inside the focused area similarly to conventional scores. Then, similarly to the second and third embodiments, if reduction display of images of surrounding areas of the focused area is performed with distance from the focused area, effects similar to those of the second and third embodiments can be obtained. Moreover, in this mode, by the amount that the image inside the focused area is not enlarged, more areas around the focused area can be displayed. Therefore, in comparison with the second and third embodiments, the user can grasp images of more forward areas. Note that this modification example is not limited to the mode of reduction-displaying grand staves around the focused grand staff relative to the focused grand staff while the focused grand staff is displayed in a normal size. For example, it may be a mode of reduction-displaying bars around a focused bar relative to the focused bar while the focused bar is displayed in a normal size.

(8) In the second and third embodiments, the focused grand staff is displayed at the highest level of the screen. However, it is not limited to the mode of displaying the focused grand staff at the highest level of the screen. For example, the focused grand staff may be displayed in the vicinity of a center of the screen. In this mode, grand staves located forward of the focused grand staff are displayed below the center of the screen, and grand staves located backward of the focused grand staff are displayed above the center of the screen. Then, the focused grand staff is displayed by enlarging to be largest, the grand staves located forward of the focused grand staff are reduced and displayed as proceeding forward, and the grand staves located backward of the focused grand staff are reduced and displayed as proceeding backward. Also in this mode, effects similar to those of the second and third embodiments can be obtained.

(9) The technical features of the first embodiment and the technical features of the second or third embodiment may be combined. For example, in the view mode, as in the second or third embodiment, the focused grand staff may be displayed by enlarging and meanwhile an image may be reduced and displayed as proceeding to grand staves located forward of the focused grand staff. In addition, as in the first embodiment, by one operation by the user, the image of the image area 22 to which the specified grand staff belongs may be enlarged and displayed on the foreground of a center of the screen, and the score displaying apparatus may be switched to the writing mode.

FIG. 21 is a flowchart illustrating a process performed by a controller 11 of a score displaying apparatus 1E combining the score displaying apparatus 1 of the first embodiment and the score displaying apparatus 1A of the second embodiment. Steps from step SC110 to step SC150 of FIG. 21 are similar to those of FIG. 9, and steps from step SB110 to step SB140 are similar to those of FIG. 7. This will be described in more detail. In the view mode, the controller 11 of the score displaying apparatus 1E performs the processes of step SC110 to step SC150, and displays grand staves on the screen as in FIG. 19. In the state displayed as in FIG. 19, when the user desired to perform writing on a focused grand staff for example, the user specifies a grand staff on which writing is desired by performing a long tap on a portion on the screen where this focused grand staff is displayed. The controller 11 of the score displaying apparatus 1E recognizes the image area to which the focused grand staff specified by the user belongs as the target image area 22 (SB110). Thereafter, similarly to the first embodiment, the controller 11 enlarges an image of the score data of the image area to which the focused grand staff belongs and an image of the writing data (SB120), displays them on the foreground of a center of the screen (SB130), and switches the control mode from the view mode to the writing mode (SB140). Note that although the process performed by the controller 11 of the score displaying apparatus 1E combining the score displaying apparatus 1 and the score displaying apparatus 1A have been described, a process performed by a controller 11 of a score displaying apparatus combining the score displaying apparatus 1 and the score displaying apparatus 1B of the third embodiment is similar to FIG. 21. In addition, the features of this modification example may of course be applied to any other score besides the score represented by a plurality of grand staves.

(10) In the second and third embodiments, when grand staves are reduction-displayed as proceeding from the focused grand staff to the forward grand staves, the focused grand staff and the grand staff located immediately forward of the focused grand staff may be displayed in the same size (by same magnification), and grand staves may be reduction-displayed as proceeding from the immediately forward grand staff to the forward grand staves. According to this mode, the user is able to more easily recognize images in the vicinity of the boundary between the focused grand staff and the immediately forward grand staff in comparison with the second and third embodiments.

(11) In the first embodiment, a text, a symbol or the like is written on the score. However, a comment to be written on the score is not limited to texts and symbols. For example, a comment may be written as a sound on the score. More specifically, the user operates to dispose a symbol such as a speaker icon on the target grand staff. The user associates sound data indicating a comment with the speaker icon. Then, by an operation such as a click on the speaker icon by the user, the controller 11 reproduces the contents of the comment associated with the speaker icon as a sound. In this mode, the image data 38 of the writing data 30 may include the sound data itself associated with the speaker icon or link information or the like to a file storing the sound data associated with the speaker icon. Further, the controller 11 may reproduce contents of comment associated with a speaker icon as a sound at an appropriate timing, such as when a grand staff on which the speaker icon is disposed becomes the focused grand staff, when a grand staff on which the speaker icon is disposed becomes the current performance position, or the like. Further, the sound data indicating the comment associated with the speaker icon may be set by the user from among sound data prepared in advance, or may be data newly generated by the user (for example, data recorded by the user). Further, writing of text and writing of sound may be used in combination. For example, at a position where a text is written, a speaker icon with which sound data having the same contents as the text is associated may be disposed.

(12) Further, a color or a special effect may be added to a text or a symbol written on a score. For example, a written text may be changed to a red text or a blue text, or a written text may be changed to a bold text or an italic text. Note that it may of course be configured to perform the writing in a state that a color or a special effect has been already set therefor. Further, it may of course be configured to be able to add a background color to the whole or part of the target image area. For example, the background of a bar specified by the user in the target image area may be changed to a pale red specified by the user. This can be realized by that, for example, writing data corresponding to a portion excluding notes, symbols, and the like in the specified bar (that is, the background portion) are changed to a data series indicating a pale red. By allowing addition of a color or the like to a text or a symbol or by allowing addition of a background color, the user can perform writing which is easier to understand.

(13) Further, the writing data may have layer information to which writing contents are associated. Moreover, a weight indicating a display priority or the like to the screen may be added to the layer information. For example, writing of a text (such as text data) may be associated with layer information to which a weight of 0.5 is added, and writing of a symbol (such as figure data) may be associated with layer information to which a weight of 0.8 is added. For example, the weight of the layer information is in a range of 0 to 1, where the closer it is to 1 the higher the weight is. Note that various modes are conceivable as a method of associating the writing contents and the layer information or adding a weight. Then, for example, the controller may set a threshold to each image area under a predetermined condition, by an operation of the user, or the like, and display in the image area only contents of writing associated with layer information to which a weight exceeding the threshold is added. Further, the controller may set different threshold values to respective image areas according to the degree of reduction when reduction-display is performed as the distance from the focused area increases in the second and third embodiments. For example, the controller may increase a threshold as the reduction degree increases. In this case, only more important writing contents are displayed as the distance from the focused area increases. Therefore, according to this mode, the user can efficiently recognize more necessary (or important) information.

(14) In the first, fourth and fifth embodiments, the controller 11 displays the enlarged image on the foreground of a center of the screen (see step SB130 of FIG. 7, step SB130 of FIG. 15, and step SE110 of FIG. 18). However, the position of displaying the enlarged image is not limited to the center of the screen. For example, the controller 11 may display an enlarged image around the position of the tip of a finger of the user or the pen point of a touch pen specifying the target of writing.

(15) The score display program according to the first embodiment is characterized in enabling a computer to function as a controller which can operate in a view mode displaying a score on a display portion and a writing mode obtaining information indicating writing on the score via an input portion, the control circuit performing a process of displaying the score on the display portion such that the image inside the target area on which writing is to be accepted in the score is enlarged in comparison with the image outside the target area, and a process of switching from the view mode to the writing mode, in response to one operation to the input portion. Further, the score display program according to the second and third embodiments is characterized in enabling a computer to function as a controller performing a process of displaying a score on the display portion such that an image inside a focused area in the score is enlarged in comparison with an image outside the focused area, and an image of an area in the vicinity of the focused area is reduced with distance from the focused area. This score display program may be traded in a state of being installed in a computer, may be traded in a state of being stored in a computer readable storage medium, or may be traded by downloading via a network. Further, the respective processes in the score display program may be realized by an electronic circuit.

(16) The above-described embodiments are described using a grand staff having a set of two staff notations. However, the technical features of the embodiments can be applied to scores of various styles such as a score constituted of one staff notation, a score constituted of a combination of a staff notation and a tablature, and a score constituted of a plurality of parts.

(17) According to the flowchart of FIG. 7, the controller 11 performs a process of switching the control mode from the view mode to the writing mode (SB140) subsequently to a process of relatively enlarging an image inside the target area in comparison with an image of other areas and displaying the images (that is, the enlarge-display process) (SB120 and SB130). However, the controller 11 may perform the enlarge-display process and the process of switching from the view mode to the writing mode in parallel. Further, the controller 11 may perform the process of switching from the view mode to the writing mode after an image area to which a specified grand staff belongs is recognized (SB110), and may perform the enlarge-display process subsequently to the switching process. This is because it is just necessary to perform at least the process of relatively enlarging an image inside the target area in comparison with an image of other areas and displaying the images, and the process of switching the control mode from the view mode to the writing mode, in response to one operation given to an input portion.

REFERENCE SIGNS LIST

1, 1C . . . score displaying apparatus, 11 . . . controller, 12 . . . user I/F, 13 . . . volatile storage, 14 . . . non-volatile storage, 15 . . . bus, 20 . . . score data, 22 . . . image area, 24 . . . grand staff part, 26 . . . upper margin, 28 . . . lower margin, 30 . . . writing data, 40 . . . staff interval data, 50 . . . enlarged staff interval data, 34 . . . score identifier, 36 . . . image area number, 38 . . . image data, 141, 141C . . . score display program.

The invention claimed is:

1. A score displaying method performed by an apparatus, the apparatus including a display and an input portion, the method comprising:

displaying, in a view mode, a score on the display, the score having associated score data, the score data including indication of a plurality of areas of the score, the areas respectively overlapping with adjacent areas;

receiving, in a writing mode of the apparatus and via an input portion, information indicating a written comment to be associated with the displayed score and generating, in response to receipt of the information and without editing the score data, writing data associated with the score data; and executing a process in response to one operation to the input portion, the process including determining a first area, among the plurality of the areas, of the displayed score in which the information indicating the written comment is to be received in the writing mode based on a position in the displayed score to which the one operation is performed, displaying the score on the display such that the first area is relatively enlarged in comparison with outside of the first area, and switching the apparatus from the view mode to the writing mode, wherein each of the plurality of areas of the score include a grand staff part, an upper margin, and a lower margin, and the upper margin of a second area of the score overlaps with the lower margin of a third area of the score different from the second area of the score, and wherein:

the upper margin of the second area of the score overlaps with the lower margin of the third area of the score to form an overlapped area included in both the second area of the score and the third area of the score, and in the writing mode, in a case where the information indicating the written comment is received in the overlapped area, the information indicating the written comment is associated with either the second area of the score if the second area of the score is being displayed during the writing mode or the third area of the score if the third area of the score is being displayed during the writing mode.

2. The score displaying method according to claim 1, wherein in the process, the displaying is executed such that the outside of the first area is gradually reduced with distance from the first area and displayed on the display.

3. The score displaying method according to claim 2, wherein the process further includes determining a plurality of areas including the first area as display target areas, and in the process, the displaying is executed such that at least an area located more forward on a timeline of the score than the first area in the display target areas is gradually reduced with distance toward a forward area on the timeline of the score from the first area.

4. The score displaying method according to claim 1, wherein in the process, the displaying including: calculating magnification from an interval of staff in the first area displayed in the view mode and an interval of staff set in advance and used for the writing mode; enlarging the first area by the calculated magnification in comparison with display in the view mode; and displaying the enlarged first area on the display portion.

5. The score displaying method according to claim 1, further comprising displaying on the display a portion of the first area not displayed on the display in response to a predetermined operation given to the input portion while the first area is enlarged and displayed on the display portion.

6. The score displaying method according to claim 5, wherein in the displaying on the display a portion of the first area not displayed on the display portion, display of the first area is scrolled at a speed according to a position where the predetermined operation is given.

7. The score displaying method according to claim 1, wherein:

the written comment received in the first area is associated with the first area among the plurality of areas of the displayed score, and the writing data includes first information associating the writing data with the score data that is associated with the displayed score, second information associating the writing data with the first area among the plurality of areas of the displayed score, and third information indicating the written comment.

8. A non-transitory machine-readable storage medium containing program instructions executable by a computer and enabling the computer to control a display and an input portion and perform a method comprising:

displaying, in a view mode, a score on the display, the score having associated score data, the score data including indication of a plurality of areas of the score, the areas respectively overlapping with adjacent areas;

receiving, in a writing mode of the apparatus and via an input portion, information indicating a written comment to be associated with the displayed score and generating, in response to receipt of the information and without editing the score data, writing data associated with the score data; and executing a process in response to one operation to the input portion, the process including determining a first area, among the plurality of the areas, of the displayed score in which the information indicating the written comment is to be received in the writing mode based on a position in the displayed score to which the one operation is performed, displaying the score on the display such that the first area is relatively enlarged in comparison with outside of the first area, and switching the apparatus from the view mode to the writing mode, wherein each of the plurality of areas of the score include a grand staff part, an upper margin, and a lower margin, and the upper margin of a second area of the score overlaps with the lower margin of a third area of the score different from the second area of the score, and wherein:

the upper margin of the second area of the score overlaps with the lower margin of the third area of the score to form an overlapped area included in both the second area of the score and the third area of the score, and in the writing mode, in a case where the information indicating the written comment is received in the overlapped area, the information indicating the written comment is associated with either the second area of the score if the second area of the score is being displayed during the writing mode or the third area of the score if the third area of the score is being displayed during the writing mode.

9. The non-transitory machine-readable storage medium according to claim 8, wherein in the process, the displaying is executed such that the outside of the first area is gradually reduced with distance from the first area and displayed on the display.

10. The non-transitory machine-readable storage medium according to claim 9, wherein the process further includes determining a plurality of areas including the first area as display target areas, and in the process, the displaying is executed such that at least an area located more forward on a timeline of the score than the first area in the display target areas is gradually reduced with distance toward a forward area on the timeline of the score from the first area.

11. The non-transitory machine-readable storage medium according to claim 8, wherein in the process, the displaying including: calculating magnification from an interval of staff in the first area displayed in the view mode and an interval of staff set in advance and used for the writing mode; enlarging the first area by the calculated magnification in comparison with display in the view mode; and displaying the enlarged first area on the display portion.

12. The non-transitory machine-readable storage medium according to claim 8, the method further comprising displaying on the display a portion of the first area not displayed on the display in response to a predetermined operation given to the input portion while the first area is enlarged and displayed on the display portion.

13. The non-transitory machine-readable storage medium according to claim 12, wherein in the displaying on the display a portion of the first area not displayed on the display portion, display of the first area is scrolled at a speed according to a position where the predetermined operation is given.

* * * * *